(12) United States Patent
Lin et al.

(10) Patent No.: US 11,425,648 B2
(45) Date of Patent: Aug. 23, 2022

(54) OPERATION WITH POWER SAVING IN CONNECTED MODE DISCONTINUOUS RECEPTION (C-DRX)

(71) Applicant: Samsung Electronics Co., Ltd., Suwon-si (KR)

(72) Inventors: Qiongjie Lin, Sunnyvale, CA (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 47 days.

(21) Appl. No.: 15/929,954

(22) Filed: May 29, 2020

(65) Prior Publication Data

US 2020/0396684 A1 Dec. 17, 2020

Related U.S. Application Data

(60) Provisional application No. 62/908,429, filed on Sep. 30, 2019, provisional application No. 62/897,204, (Continued)

(51) Int. Cl.
*G08C 17/00* (2006.01)
*H04W 52/02* (2009.01)
(Continued)

(52) U.S. Cl.
CPC ....... *H04W 52/0225* (2013.01); *H04L 5/0048* (2013.01); *H04W 72/042* (2013.01); *H04W 72/0413* (2013.01)

(58) Field of Classification Search
CPC ......... H04W 52/0225; H04W 72/0413; H04W 72/042; H04L 5/0048
(Continued)

(56) References Cited

U.S. PATENT DOCUMENTS 9,974,058 B2 * 5/2018 Määttanen ............ H04L 5/0048
2014/0112221 A1 4/2014 Verger et al.
(Continued)

FOREIGN PATENT DOCUMENTS

WO WO-2009118707 A1 * 10/2009 .......... H04L 1/0026
WO 2014062489 A1 4/2014
WO 20180143876 A1 8/2018

OTHER PUBLICATIONS

Apple (R1-1907345, Design of PDCCH-based Power Saving Signal and Channel, Reno, USA, May 13-17, 2019) (Year: 2019).*
(Continued)

*Primary Examiner* — Maharishi V Khirodhar

(57) ABSTRACT

A user equipment (UE), a base station (BS), and a method for managing UE operation in C-DRX. The UE includes a transceiver configured to receive configurations for a drx-onDurationTimer, search space sets for reception of a PDCCH, a first set of CSI-RS resources, SS/PBCH blocks, and a PUCCH resources; and the PDCCH that provides a DCI format including a field indicating whether or not to start the drx-onDurationTimer. A processor is configured to determine an indication by the field to not start the drx-onDurationTimer, and determine reception occasions for the first set of CSI-RS resources during the ON duration. The transceiver is configured to receive the first set of CSI-RS resources or the SS/PBCH blocks during at least one of the reception occasions. The processor is also configured to determine a CSI report based on a reception occasion, which can be transmitted using the PUCCH resource during the ON duration.

20 Claims, 19 Drawing Sheets

Related U.S. Application Data filed on Sep. 6, 2019, provisional application No. 62/861,550, filed on Jun. 14, 2019.

(51) Int. Cl.
*H04L 5/00* (2006.01)
*H04W 72/04* (2009.01)

(58) Field of Classification Search
USPC .......................................................... 370/311
See application file for complete search history.

(56) References Cited

U.S. PATENT DOCUMENTS

| | | | |
|---|---|---|---|
| 2015/0181450 A1* | 6/2015 | Xin ....................... | H04W 24/10 370/252 |
| 2016/0044654 A1* | 2/2016 | Dalsgaard ......... | H04W 52/0216 370/329 |
| 2017/0251518 A1 | 8/2017 | Agiwal et al. | |
| 2018/0048375 A1* | 2/2018 | Guo ..................... | H04B 7/0456 |
| 2018/0083684 A1* | 3/2018 | He ....................... | H04B 7/0626 |
| 2019/0053174 A1* | 2/2019 | Nangia ............. | H04W 72/1289 |
| 2019/0090299 A1* | 3/2019 | Ang .................. | H04W 72/0446 |
| 2019/0141546 A1 | 5/2019 | Zhou et al. | |
| 2019/0159126 A1 | 5/2019 | Kadiri et al. | |
| 2021/0250115 A1* | 8/2021 | Harada ................. | H04L 5/005 |
| 2022/0007292 A1* | 1/2022 | Seo ....................... | H04W 72/12 |

OTHER PUBLICATIONS

CMCC (R1-1812891, Discussion on CSI report enhancement for CDRX, Spokane, USA, Nov. 12-16, 2018). (Year: CMCC).*
3gpp (TR 38.840 V2.0.0, May 2019, Release 16) (Year: 2019).*
Huawei (R1-1906005, PDCCH-based power saving signal/channel, May 13-17, 2019) (Year: 2019).*
MediaTek Inc. (R1-1901804, "NR UE power saving Designs", Feb. 25-Mar. 1, 2019) (Year: 2019).*
CATT (R1-1906350, PDCCH-Based power saving signal/Channel design, May 13-17, 2019) (Year: 2019).*
OPPO (R1-1810976, "UE adaptation to the traffic for UE power saving", Oct. 8-12, 2018) (Year: 2018).*
International Search Report and Written Opinion of the International Searching Authority in connection with International Application No. PCT/KR2020/007227 dated Sep. 11, 2020, 7 pages.
CMCC, "Discussion on PDCCH-based power saving signal/channel design," R1-1906524, 3GPP TSG RAN WG1 #97, Reno, USA, May 13-17, 2019, 10 pages.
Huawei, et al., "Discussion on the impact of DCI-based power saving adaptation," R2-1904968, 3GPP TSG-RAN2 Meeting#105bis, Xian, China, Apr. 8-12, 2019, 3 pages.
Sony, "Issues related to PDCCH-based power saving channel," R1-1906856, 3GPP TSG RAN WG1 #97, Reno, USA, May 13-17, 2019, 11 pages.
CATT, "PDCCH-Based Power Saving Signal/Channel Design", 3GPP TSG RAN WG1 Meeting #97, May 13-17, 2019, R1-1906350, 14 pages.
MediaTek Inc., "Design of PDCCH-based power saving signal/ channel for NR", 3GPP TSG RAN WG1 Meeting #97, May 13-17, 2019, R1-1906548, 16 pages.
CATT, "Report on [105bis#27][NR/Power Saving]—PDCCH skipping", 3GPP TSG-RAN WG2 Meeting #106, May 13-17, 2019, R2-1908072, 26 pages.
European Search Report dated Jul. 13, 2020 in connection with European Patent Application No. 20 17 8722, 11 pages.
"3rd Generation Partnership Project; Technical Specification Group Radio Access Network; NR; Physical channels and modulation (Release 15)", 3GPP TS 38.211 V15.5.0, Mar. 2019, 96 pages.
"3rd Generation Partnership Project; Technical Specification Group Radio Access Network; NR; Multiplexing and channel coding( Release 15)", 3GPP TS 38.212 V15.5.0, Mar. 2019, 101 pages.
"3rd Generation Partnership Project; Technical Specification Group Radio Access Network; NR; Physical layer procedures for control (Release 15)", 3GPP TS 38.213 V15.5.0, Mar. 2019, 104 pages.
"3rd Generation Partnership Project; Technical Specification Group Radio Access Network; NR; Physical layer procedures for data (Release 15)", 3GPP TS 38.214 V15.5.0, Mar. 2019, 103 pages.
"3rd Generation Partnership Project; Technical Specification Group Radio Access Network; NR; Physical layer measurements, (Release 15)", 3GPP TS 38.215 V15.5.0, Jun. 2019, 16 pages.
"3rd Generation Partnership Project; Technical Specification Group Radio Access Network; NR; Radio Resource Control (RRC) protocol specification, (Release 15)", 3GPP TS 38.331 V15.5.0, Mar. 2019, 491 pages.
"5G; NR; Medium Access Control (MAC) protocol specification (3GPP TS 38.321 version 15.5.0 Release 15)", ETSI TS 138 321 V15.5.0, May 2019, 80 pages.
"3rd Generation Partnership Project; Technical Specification Group Radio Access Network; NR; Requirements for support of radio resource management, (Release 16)", 3GPP TS 38.133 V16.0.0, Jun. 2019, 999 pages.
Notification of the Reasons for Rejection dated Sep. 30, 2021, in connection with Korean Application No. 10-2020-7028791, 10 pages.
Communication pursuant to Article 94(3) EPC dated Oct. 15, 2021, in connection with European Application No. 20178722.3, 7 pages.

* cited by examiner

OPERATION WITH POWER SAVING IN CONNECTED MODE DISCONTINUOUS RECEPTION (C-DRX)

CROSS-REFERENCE TO RELATED APPLICATION AND CLAIM OF PRIORITY

This application claims priority under 35 U.S.C. § 119(e) to U.S. Provisional Patent Application No. 62/861,550 filed on Jun. 14, 2019, to U.S. Provisional Patent Application No. 62/897,204 filed on Sep. 6, 2019, and to U.S. Provisional Patent Application No. 62/908,429 filed on Sep. 30, 2019. The above-identified provisional patent applications are hereby incorporated by reference in its entirety.

TECHNICAL FIELD

The present disclosure relates to a pre-$5^{th}$-Generation (5G) or 5G communication system to be provided for supporting higher data rates Beyond $4^{th}$-Generation (4G) communication system such as Long-Term Evolution (LTE). In particular, aspects of the present disclosure relates to managing UE operation in C-DRX.

BACKGROUND

To meet the increased demand for wireless data services since the deployment of 4G communication systems, efforts have been made to develop an improved 5G or pre-5G communication system. Therefore, the 5G or pre-5G communication system is also called a 'Beyond 4G Network' or a 'Post LTE System'. A 5G communication system can be implemented in higher frequency (mmWave) bands, e.g., 60 GHz bands, compared to a 4G communication system to provide higher data rates. To decrease a propagation loss of radio waves and increase a transmission distance, beamforming, massive multiple-input multiple-output (MIMO), Full Dimensional MIMO (FD-MIMO), array antenna, analog beamforming, and large-scale antenna techniques are considered in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large-scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

SUMMARY

Embodiments of the present disclosure include a user equipment (UE), a base station (BS), and method for managing UE operation in C-DRX.

One embodiment is directed to a UE that includes a transceiver configured to receive configurations for (i) a drx-onDurationTimer corresponding to an ON duration of a discontinuous reception (DRX) cycle, (ii) search space sets for reception of a physical downlink control channel (PDCCH) prior to the ON duration of the DRX cycle, (iii) a first set of channel state information reference signal (CSI-RS) resources, (iv) synchronization signals/physical broadcast channel (SS/PBCH) blocks, and (v) a physical uplink control channel (PUCCH) resource. The transceiver is also configured to receive the PDCCH, wherein the PDCCH provides a DCI format that includes a field indicating whether or not to start the drx-onDurationTimer. The UE also includes a processor operably connected to the transceiver and configured to determine an indication by the field to not start the drx-onDurationTimer and determine reception occasions for the first set of CSI-RS resources during the ON duration. The transceiver is also configured to receive the first set of CSI-RS resources or the SS/PBCH blocks during at least one of the reception occasions. The processor is also configured to determine a channel state information (CSI) report based on a reception occasion from the at least one of the reception occasions. Additionally, the transceiver can transmit a PUCCH with the CSI report using the PUCCH resource during the ON duration.

Another embodiment is directed to a BS that includes a processor configured to generate configurations for (i) a drx-onDurationTimer corresponding to an ON duration of a discontinuous reception (DRX) cycle, (ii) search space sets for reception of a physical downlink control channel (PDCCH) prior to the ON duration of the DRX cycle, (iii) a first set of channel state information reference signal (CSI-RS) resources, (iv) synchronization signals/physical broadcast channel (SS/PBCH) blocks, and (v) a physical uplink control channel (PUCCH) resource. The BS also includes a transceiver operably connected to the processor and configured to transmit the generated configurations; transmit the PDCCH, which provides a DCI format that includes a field indicating whether or not to start the drx-onDurationTimer; transmit the first set of CSI-RS resources or the SS/PBCH blocks during at least one reception occasion from reception occasions determined for the first set of CSI-RS resources during the ON duration; and receive a PUCCH with a channel state information (CSI) report using the PUCCH resource during the ON duration. The CSI report is determined based on a reception occasion from the at least one of the reception occasions.

Yet another embodiment is directed to a method that includes steps of receiving configurations for (i) a drx-onDurationTimer corresponding to an ON duration of a discontinuous reception (DRX) cycle, (ii) search space sets for reception of a physical downlink control channel (PDCCH) prior to the ON duration of the DRX cycle, (iii) a first set of channel state information reference signal (CSI-RS) resources, (iv) synchronization signals/physical broadcast channel (SS/PBCH) blocks, and (v) a physical uplink control channel (PUCCH) resource; receiving the PDCCH, which provides a DCI format that includes a field indicating whether or not to start the drx-onDurationTimer;

determining an indication by the field to not start the drx-onDurationTimer; determining reception occasions for the first set of CSI-RS resources during the ON duration; receiving the first set of CSI-RS resources or the SS/PBCH blocks during at least one of the reception occasions; determining a channel state information (CSI) report based on a reception occasion from the at least one of the reception occasions; and transmitting a PUCCH with the CSI report using the PUCCH resource during the ON duration.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
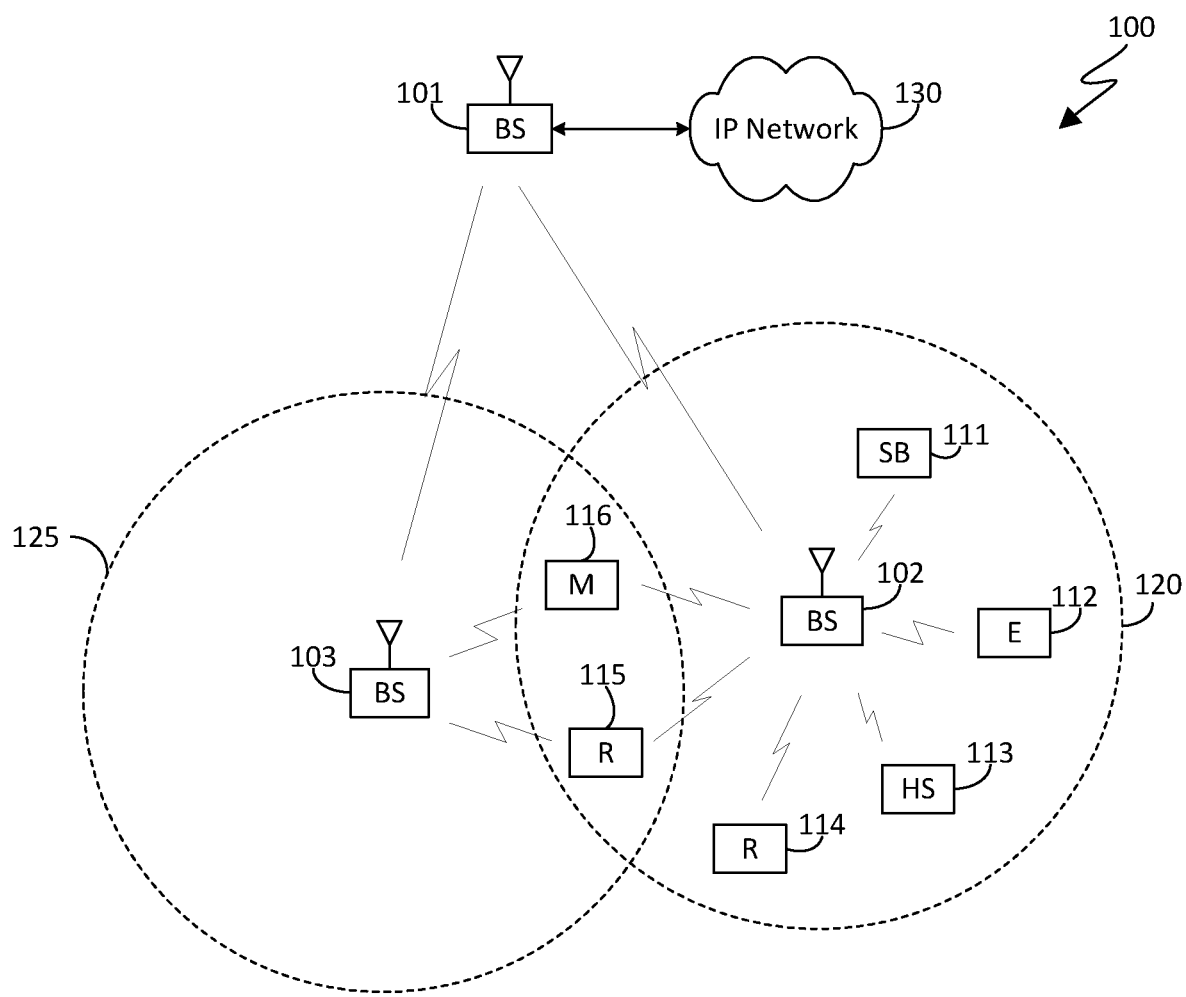
FIG. 1 illustrates an exemplary networked computing system according to various embodiments of this disclosure.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

The following documents are hereby incorporated by reference into the present disclosure as if fully set forth herein: 3GPP TS 38.211 v15.5.0, "NR; Physical channels and modulation", hereinafter "REF 1"; 3GPP TS 38.212 v15.5.0, "NR; Multiplexing and channel coding", hereinafter "REF 2"; 3GPP TS 38.213 v15.5.0, "NR; Physical layer procedures for control", hereinafter "REF 3"; 3GPP TS 38.214 v15.5.0, "NR; Physical layer procedures for data", hereinafter "REF 4"; 3GPP TS 38.215 v15.5.0, "NR; Physical layer measurements", hereinafter "REF 5"; 3GPP TS 38.331 v15.5.0, "NR; Radio Resource Control (RRC) protocol specification", hereinafter "REF 6"; 3GPP TS 38.321 v15.5.0, "NR; Medium Access Control (MAC) protocol specification", hereinafter "REF 7"; and 3GPP TS 38.133 v16.0.0, "NR; Requirements for support of radio resource management", hereinafter "REF 8".

"Antenna-related elements" are a set of components that can include RF chain, PF path (mixer, power amplifier, phase shifter, etc.), panel, physical antenna elements, etc. Based on the maximum number of MIMO layers (Lmax), a UE can activate/deactivate its antenna related elements to reduce power consumption. For example, the UE can activate the smallest number of "antenna related elements" which is able to receive the Lmax MIMO layers. The antenna-related components that can be turned on/off can be determined by UE implementation so that the impact from the antenna adaptation can be different for each of UE. Without any specification support, antenna adaptation can be possible by UE implementation based on the number of layers indicated by scheduling DCI if a sufficient time gap for antenna adaptation is guaranteed.

In NR Rel-15, Lmax is configured per cell by PDSCH-ServingCellConfig for DL and PUSCH-ServingCellConfig for UL via higher layer signaling. The indicated Lmax is used for PDSCH/PUSCH in all BWPs of the serving cell. It should be noted that the dynamic antenna adaptation based on the UE implementation is still supportable even though Lmax is per-cell configuration. However, per-cell configuration of Lmax is inefficient when there is no traffic or less traffic. If a UE is configured with multiple BWPs and there is no traffic so that the bwp-InactivityTimer is expired, the UE switches to default BWP (e.g., narrow BWP). However, the UE still needs to activate antennas based on the Lmax configured per-cell although the UE is operating in default BWP.

For the UL transmission in NR Rel-15, a UE can be configured to perform both codebook-based PUSCH transmission and non-codebook based transmission.

For the codebook-based transmission, Lmax is determined by maxRank in PUSCH-Config configured per BWP. However, the activated TX antenna ports or RF chains is limited by number of SRS ports, i.e. nrofSRS-Ports, configured per SRS resource and the number of SRS resources. In Rel-15, a UE can be configured with up to 4 SRS ports per SRS resource and the maximum number of SRS resources for multiple-panel that can be configured is 2.

For non-codebook based transmission, the maximum MIMO layer is determined by the number of SRS resources. In NR Rel-15 only one SRS port per SRS resource can be configured and the maximum number of SRS resources that can be configured is 4.

Therefore, novel aspects of the present disclosure recognize the need to support adaptation on RX antennas at UE based on maximum MIMO layer for PDSCH configured per BWP; to support adaptation on TX antennas at UE based on maximum MIMO layer for PUSCH configured per BWP; to support adaptation on RX antennas based on maximum RX antenna ports configured per BWP; to support adaptation on TX antennas based on maximum SRS ports or maximum SRS resources configured per BWP; and to consider additional antenna switch delay on top of BWP switching delay or PDSCH/PUSCH scheduling offset.

Other novel aspects of the present disclosure are directed to managing UE operation for various transmission and reception scenarios during a DRX ON duration after receiving an indication by a power saving signal/channel to operate in a power saving mode. A UE may receive an indication to skip PDCCH monitoring for a next one or more DRX ON duration(s), but some exceptions can be necessary for proper UE operation, as provided for in the following exemplary, yet non-limiting scenarios. A first scenario concerns PDCCH monitoring for system information updates or for PDCCH monitoring in a common search space (CSS). PDCCH monitoring in a CSS can be for detecting a DCI format 2_2 that provides transmit power control (TPC) commands for PUSCH transmissions or PUCCH transmissions, or for detecting a DCI format 2_1 that provides an indication of a slot format for each slot in a number of slots. A second scenario concerns transmission of a scheduling request (SR) when the UE has data for transmission that arrives at the UE's buffer during a DRX ON duration where the UE has been indicated by a power saving signal/channel to operate in a power saving mode. A third scenario concerns the ability of a UE to maintain a link with a serving gNB, maintain synchronization, and perform beam tracking procedures during DRX ON duration(s) where the UE has been indicated by a power saving signal/channel to operate in a power saving mode.

Thus, certain aspects recognize the need to determine a UE operation related to PDCCH monitoring when the UE has been indicated to operate in a power saving mode during one or more DRX ON durations; to determine a UE operation when the UE is indicated by higher layers to transmit a positive scheduling request (SR) at the physical layer when the UE has also been indicated to operate in a power saving mode during one or more DRX ON durations; to determine a UE operation related to periodic/semi-persistent PUSCH transmission or periodic/semi-persistent PDSCH reception when the UE has been indicated to operate in a power saving mode during one or more DRX ON durations; to determine a UE operation related to periodic/semi-persistent CSI measurements and periodic/semi-persistent transmissions of CSI reports when the UE has been indicated to operate in a power saving mode during one or more DRX ON durations; to determine a UE operation related to periodic/semi-persistent SRS transmissions when the UE has been indicated to operate in a power saving mode during one or more DRX ON durations; and to determine a UE operation related to a transmission of a physical random access channel (PRACH) when the UE has been indicated to operate in a power saving mode during one or more DRX ON durations FIG. 1 illustrates an exemplary networked computing system according to various embodiments of this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an gNodeB (gNB) 101, an gNB 102, and an gNB 103. The gNB 101 communicates with the gNB 102 and the gNB 103. The gNB 101 also communicates with at least one Internet Protocol (IP) network 130, such as the Internet, a proprietary IP network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WIFI hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116.

Depending on the network type, the term 'base station' can refer to any component (or collection of components) configured to provide wireless access to a network, such as transmit point (TP), transmit-receive point (TRP), a gNB, a macrocell, a femtocell, a WIFI access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, wireless network 100 can be a 5G communication system in which a UE, such as UE 116, can communicate with a BS, such as BS 102, for UE antenna adaptation for power saving in C-DRX. In one embodiment, antenna adaptation can be applied to RX antennas for DL data reception based on per BWP determined maximum MIMO layer. In another embodiment, antenna adaptation can be applied to TX antennas for UL data transmission based on per BWP determined maximum MIMO layer and/or maximum transmit antenna ports.

Although FIG. 1 illustrates one example of a wireless network 100, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNB 101, 102, and/or 103 could provide access to other or additional external networks, such as external telephone networks or other types of data networks.

Figure 2:
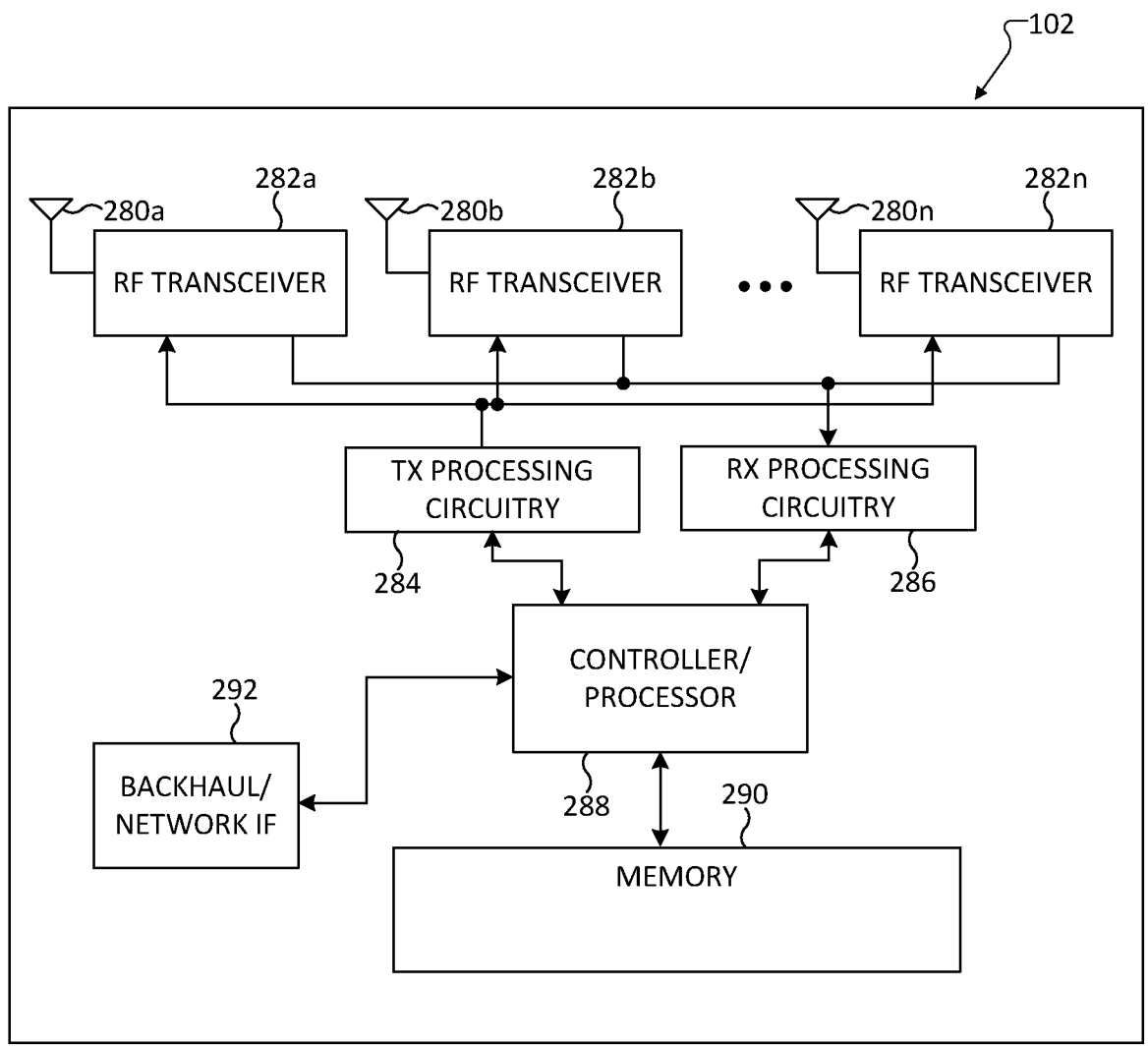
FIG. 2 illustrates an exemplary base station (BS) in the networked computing system according to various embodiments of this disclosure.

FIG. 2 illustrates an exemplary base station (BS) according to various embodiments of this disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of an gNB.

As shown in FIG. 2, the gNB 102 includes multiple antennas 280a-280n, multiple RF transceivers 282a-282n, transmit (TX) processing circuitry 284, and receive (RX) processing circuitry 286. The gNB 102 also includes a controller/processor 288, a memory 290, and a backhaul or network interface 292.

The RF transceivers 282a-282n receive, from the antennas 280a-280n, incoming RF signals, such as signals transmitted by UEs in the network 100. The RF transceivers 282a-282n down-convert the incoming RF signals to generate IF or baseband signals. The IF or baseband signals are sent to the RX processing circuitry 286, which generates processed baseband signals by filtering, decoding, and/or digitizing the baseband or IF signals. The RX processing circuitry 286 transmits the processed baseband signals to the controller/processor 288 for further processing.

The TX processing circuitry 284 receives analog or digital data (such as voice data, web data, e-mail, or interactive video game data) from the controller/processor 288. The TX processing circuitry 284 encodes, multiplexes, and/or digitizes the outgoing baseband data to generate processed baseband or IF signals. The RF transceivers 282a-282n receive the outgoing processed baseband or IF signals from the TX processing circuitry 284 and up-converts the baseband or IF signals to RF signals that are transmitted via the antennas 280a-280n.

The controller/processor 288 can include one or more processors or other processing devices that control the overall operation of the gNB 102. For example, the controller/processor 288 could control the reception of forward channel signals and the transmission of reverse channel signals by the RF transceivers 282a-282n, the RX processing circuitry 286, and the TX processing circuitry 284 in accordance with well-known principles. The controller/processor 288 could support additional functions as well, such as more advanced wireless communication functions. For instance, the controller/processor 288 could support beam forming or directional routing operations in which outgoing signals from multiple antennas 280a-280n are weighted differently to effectively steer the outgoing signals in a desired direction. Any of a wide variety of other functions could be supported in the gNB 102 by the controller/processor 288. In some embodiments, the controller/processor 288 includes at least one microprocessor or microcontroller.

The controller/processor 288 is also capable of executing programs and other processes resident in the memory 290, such as a basic OS. The controller/processor 288 can move data into or out of the memory 290 as required by an executing process.

The controller/processor 288 is also coupled to the backhaul or network interface 292. The backhaul or network interface 292 allows the gNB 102 to communicate with other devices or systems over a backhaul connection or over a network. The interface 292 could support communications over any suitable wired or wireless connection(s). For example, when the gNB 102 is implemented as part of a cellular communication system (such as one supporting 5G, LTE, or LTE-A), the interface 292 could allow the gNB 102 to communicate with other gNBs over a wired or wireless backhaul connection. When the gNB 102 is implemented as an access point, the interface 292 could allow the gNB 102 to communicate over a wired or wireless local area network or over a wired or wireless connection to a larger network (such as the Internet). The interface 292 includes any suitable structure supporting communications over a wired or wireless connection, such as an Ethernet or RF transceiver.

The memory 290 is coupled to the controller/processor 288. Part of the memory 290 could include a RAM, and another part of the memory 290 could include a Flash memory or other ROM.

As described in more detail below, the BS 102 can communicate information to a UE, such as UE 116 in FIG. 1 over a networked computing system, for UE antenna adaptation for power saving in C-DRX. In one embodiment, antenna adaptation can be applied to RX antennas for DL data reception based on per BWP determined maximum MIMO layer. In another embodiment, antenna adaptation can be applied to TX antennas for UL data transmission based on per BWP determined maximum MIMO layer and/or maximum transmit antenna ports.

Although FIG. 2 illustrates one example of gNB 102, various changes may be made to FIG. 2. For example, the gNB 102 could include any number of each component shown in FIG. 2. As a particular example, an access point could include a number of interfaces 292, and the controller/processor 288 could support routing functions to route data between different network addresses. As another particular example, while shown as including a single instance of TX processing circuitry 284 and a single instance of RX processing circuitry 286, the gNB 102 could include multiple instances of each (such as one per RF transceiver). Also, various components in FIG. 2 could be combined, further subdivided, or omitted and additional components could be added according to particular needs.

Figure 3:
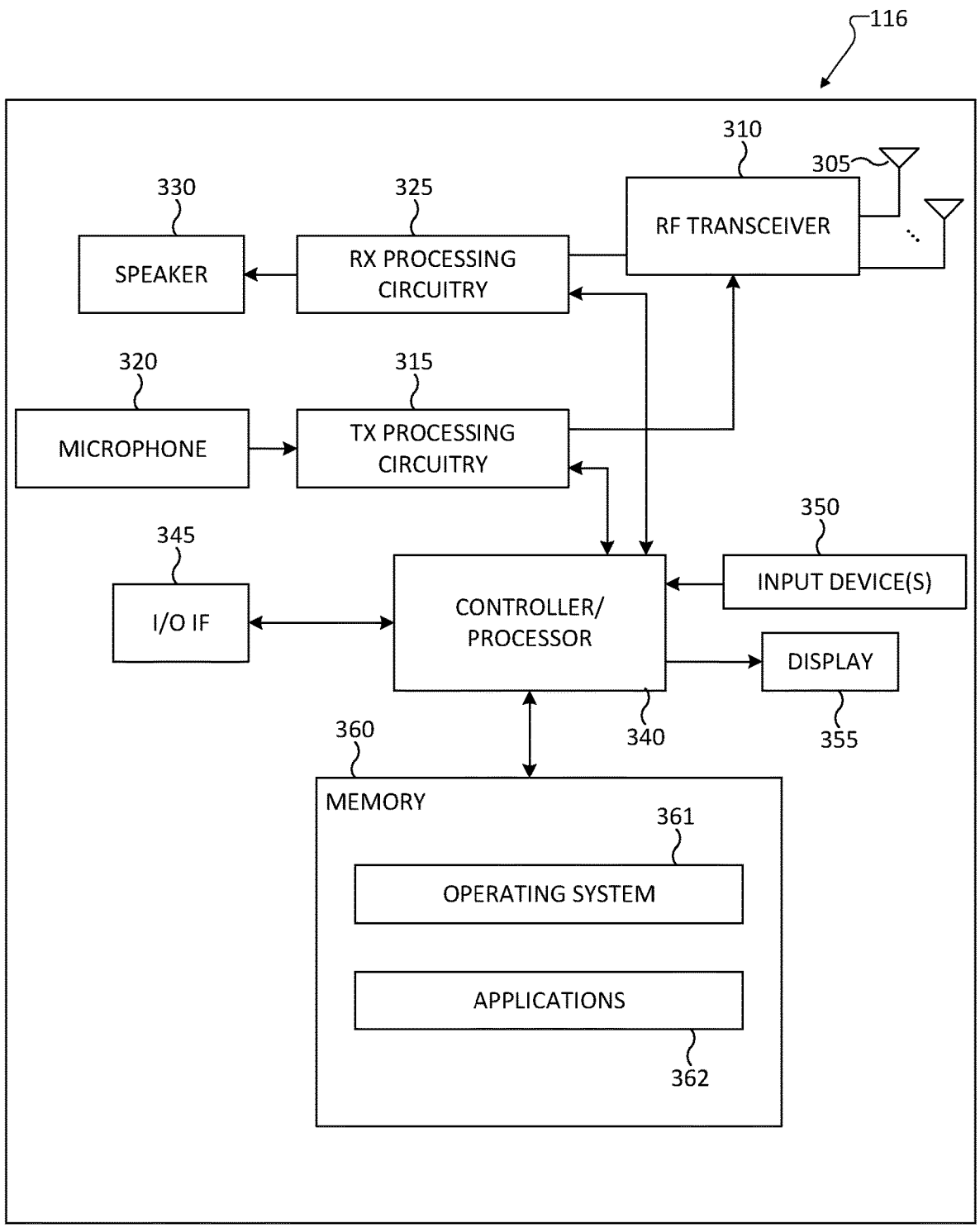
FIG. 3 illustrates an exemplary user equipment (UE) in the networked computing system according to various embodiments of this disclosure.

FIG. 3 illustrates an exemplary user equipment (UE) according to various embodiments of this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from gNBs or an operator. The main processor 340 is also coupled to the I/O interface 345, which provides the UE 116 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random-access memory (RAM), and another part of the memory 360 could include a Flash memory or other read-only memory (ROM).

As described in more detail below, UE 116 can communicate with a BS, such as BS 102 in FIG. 2 over a networked computing system, for UE antenna adaptation for power saving in C-DRX. In one embodiment, antenna adaptation can be applied to RX antennas for DL data reception based on per BWP determined maximum MIMO layer. In another embodiment, antenna adaptation can be applied to TX antennas for UL data transmission based on per BWP determined maximum MIMO layer and/or maximum transmit antenna ports.

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
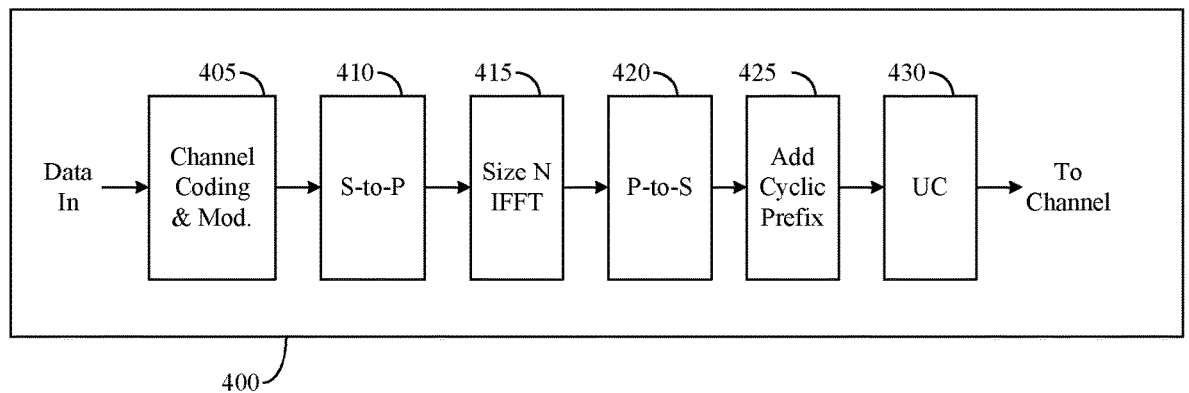
FIGS. 4A and 4B illustrate exemplary transmit and receive paths according to various embodiments of this disclosure.
Figure 4B:
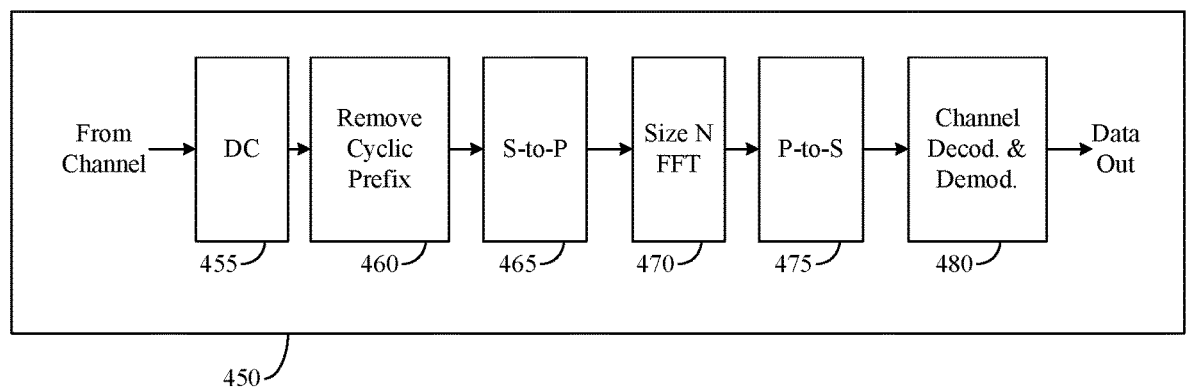

FIGS. 4A and 4B illustrate exemplary wireless transmit and receive paths according to various embodiments of this disclosure. In FIGS. 4A and 4B, for downlink communication, the transmit path circuitry can be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. The receive path 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in transmit path 400 and receive path 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In the following example, the transmit path 400 is implemented in a BS and the receive path is implemented in a UE. In transmit path 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal can arrive at a UE after passing through the wireless channel, and reverse operations to those at a gNB are performed. Down-converter 455 down-converts the received signal to baseband frequency and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path 400 that is analogous to transmitting in the downlink to user equipment 111-116 and may implement a receive path 450 that is analogous to receiving in the uplink from user equipment 111-116. Similarly, each one of user equipment 111-116 may implement a transmit path 400 corresponding to the architecture for transmitting in the uplink to gNBs 101-103 and may implement a receive path 450 corresponding to the architecture for receiving in the downlink from gNBs 101-103.

As described in more detail below the transmit path 400 and receive path 450 can be implemented in UEs, such as UE 116 in FIG. 3, and BSs, such as BS 102 in FIG. 2, for communicating information over a networked computing system for UE antenna adaptation for power saving in C-DRX. In one embodiment, antenna adaptation can be applied to RX antennas for DL data reception based on per BWP determined maximum MIMO layer. In another embodiment, antenna adaptation can be applied to TX antennas for UL data transmission based on per BWP determined maximum MIMO layer and/or maximum transmit antenna ports.

Although FIGS. 4A and 4B illustrate examples of wireless transmit and receive paths, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

Figure 5:
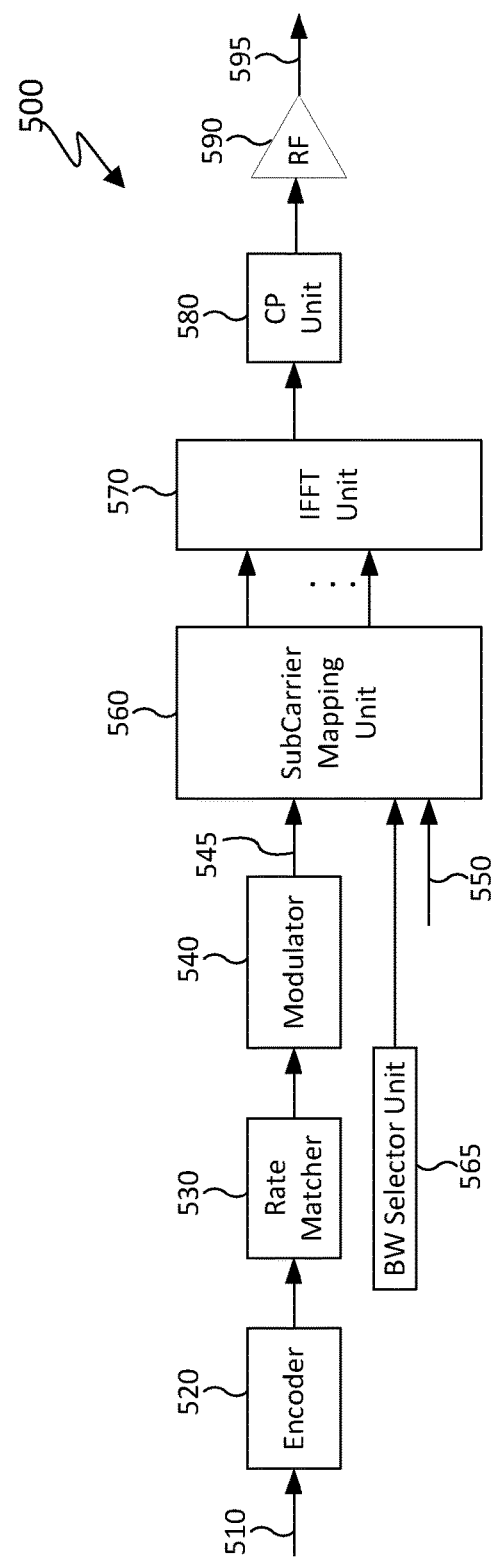
FIG. 5 illustrates an exemplary transmitter according to various embodiments of this disclosure.

FIG. 5 illustrates an exemplary transmitter according to various embodiments of this disclosure. The transmitter 500 can be implemented in an electronic device communicating via networked computing system, such as gNB 101 or UE 111.

Information bits 510, such as DCI bits or data bits, are encoded by encoder 520 and then rate matched to assigned time/frequency resources by rate matcher 530. The output from rate matcher 530 is modulated by modulator 540. The modulated and encoded symbols 545 and DMRS or CSI-RS 550 are mapped by SC mapping unit 560 based on SCs selected by BW selector unit 565. An inverse fast Fourier transform (IFFT) is performed by IFFT unit 570 and a cyclic prefix (CP) is added by CP insertion unit 580. The resulting signal is filtered by filter 590 to generated filtered signal 595, which is transmitted by a radio frequency (RF) unit (not shown).

Figure 6:
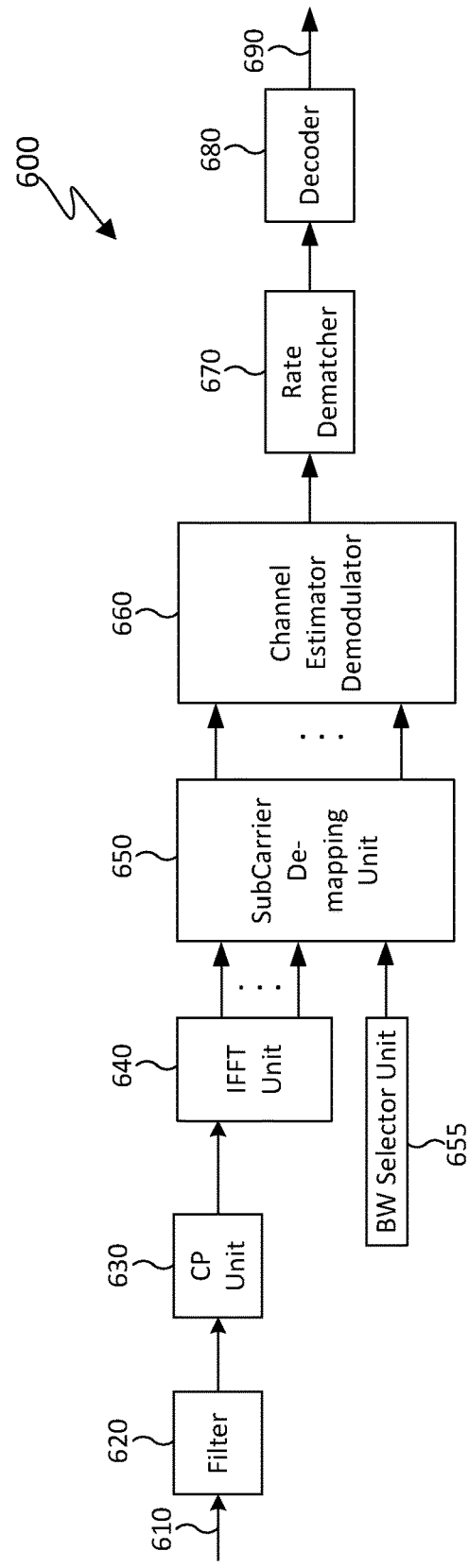
FIG. 6 illustrates an exemplary receiver according to various embodiments of this disclosure.

FIG. 6 illustrates an exemplary receiver according to various embodiments of this disclosure. The receiver 600 can be implemented in an electronic device communicating via networked computing system, such as gNB 101 or UE 111.

A received signal 610 is filtered by filter 620 and then passed through a CP removal unit 630 that removes a cyclic prefix. IFFT unit 640 applies a fast Fourier transform (FFT) and the resulting signals are provided to SCs de-mapping unit 650. The SC de-mapping unit 650 de-maps SCs selected by BW selector unit 655. Received symbols are demodulated by a channel estimator and demodulator unit 660. A rate de-matcher 670 restores a rate matching and a decoder 280 decodes the resulting bits to provide information bits 290.

Each of the gNBs 101-103 may implement a transmitter 400 for transmitting in the downlink to UEs 111-116 and may implement a receiver 600 for receiving in the uplink from UEs 111-116. Similarly, each of UEs 111-116 may implement a transmitter 400 for transmitting in the uplink to gNBs 101-103 and may implement a receiver 600 for receiving in the downlink from gNBs 101-103.

As described in more detail below, the transmitter 500 and receiver 600 can be included in UEs and BSs, such as UE 116 and BS 102, for communicating information between a UE and BS for UE antenna adaptation for power saving in C-DRX. In one embodiment, antenna adaptation can be applied to RX antennas for DL data reception based on per BWP determined maximum MIMO layer. In another embodiment, antenna adaptation can be applied to TX antennas for UL data transmission based on per BWP determined maximum MIMO layer and/or maximum transmit antenna ports.

Each of the components in FIGS. 5 and 6 can be implemented using only hardware or using a combination of hardware and software/firmware. As a particular example, at least some of the components in FIGS. 5 and 6 may be implemented in software, while other components may be implemented by configurable hardware or a mixture of software and configurable hardware. For instance, the IFFT block 570 may be implemented as configurable software algorithms.

Furthermore, although described as using IFFT, this is by way of illustration only and should not be construed to limit the scope of this disclosure. Other types of transforms, such as Discrete Fourier Transform (DFT) and Inverse Discrete Fourier Transform (IDFT) functions, could be used.

Although FIGS. 5 and 6 illustrate examples of wireless transmitters and receivers, various changes may be made. For example, various components in FIGS. 5 and 6 could be combined, further subdivided, or omitted and additional components could be added according to particular needs. Also, FIGS. 5 and 6 are meant to illustrate examples of the types of transmitters and receivers that could be used in a wireless network. Any other suitable architectures could be used to support wireless communications in a wireless network.

Figure 7:
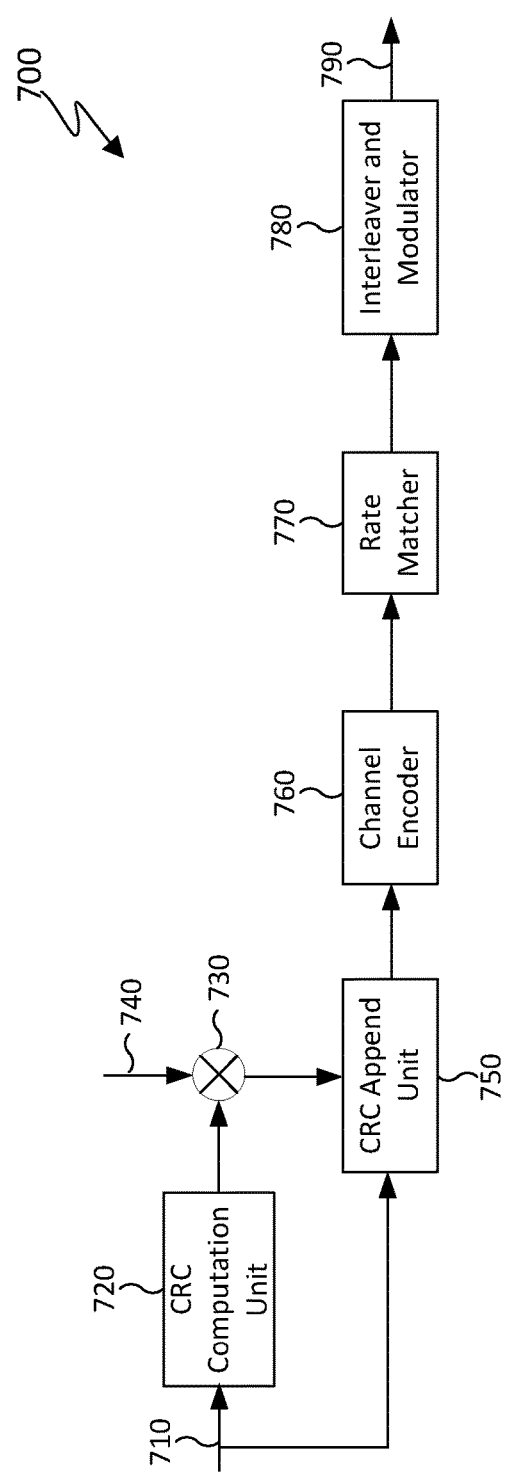
FIG. 7 illustrates an exemplary encoding flowchart for a DCI format in accordance with various embodiments of this disclosure.

FIG. 7 illustrates an exemplary encoding flowchart for a DCI format in accordance with various embodiments of this disclosure. The encoding flowchart 700 can be implemented in a BS, such as gNB 102 in FIG. 2.

A gNB separately encodes and transmits each DCI format in a respective PDCCH. When applicable, a RNTI for a UE that a DCI format is intended for masks a CRC of the DCI format codeword in order to enable the UE to identify the DCI format. For example, the CRC can include 16 bits or 24 bits and the RNTI can include 16 bits or 24 bits. Otherwise, when a RNTI is not included in a DCI format, a DCI format type indicator field can be included in the DCI format. The CRC of non-coded DCI format information bits 710 is determined using a CRC computation unit 720, and the CRC is masked using an exclusive OR (XOR) operation unit 730 between CRC bits and RNTI bits 740. The XOR operation is defined as XOR(0, 0)=0, XOR(0, 1)=1, XOR(1, 0)=1, XOR(1, 1)=0. The masked CRC bits are appended to DCI format information bits using a CRC append unit 750. A channel encoder 760 performs channel coding (such as tail-biting convolutional coding or polar coding), followed by rate matching to allocated resources by rate matcher 770. Interleaver and modulator unit 780 applies interleaving and modulation, such as QPSK, and the output control signal 790 is transmitted.

Figure 8:
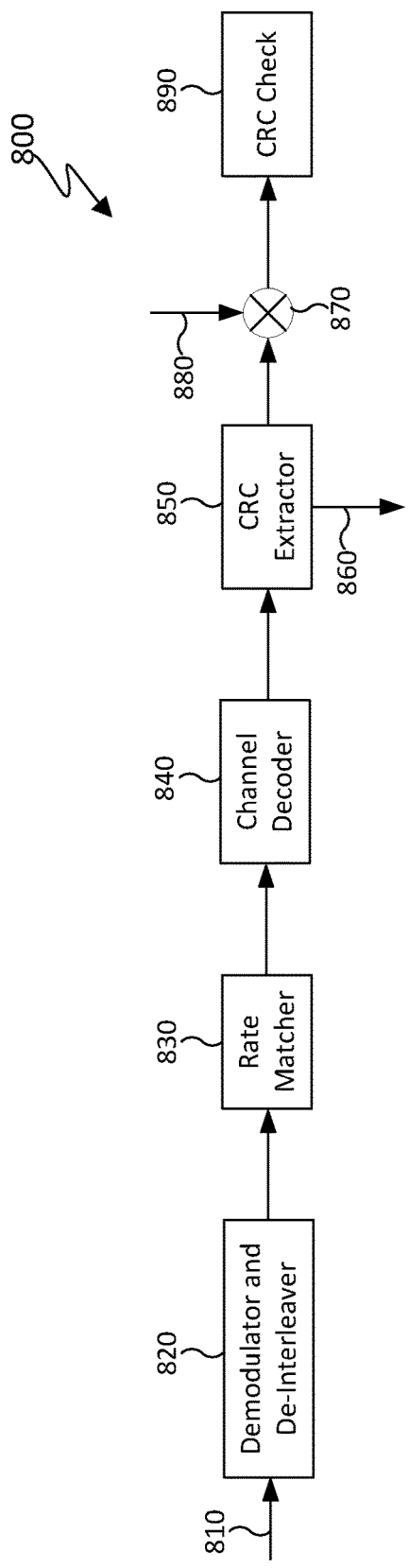
FIG. 8 illustrates an exemplary decoding flowchart for a DCI format in accordance with various embodiments of this disclosure.

FIG. 8 illustrates an exemplary decoding flowchart for a DCI format in accordance with various embodiments of this disclosure. The decoding flowchart 800 can be implemented in a UE, such as UE 116 in FIG. 3.

A received control signal 810 is demodulated and de-interleaved by a demodulator and a de-interleaver 820. Rate matching applied at a transmitter is restored by rate matcher 830, and resulting bits are decoded by decoder 840. After decoding, a CRC extractor 850 extracts CRC bits and provides DCI format information bits 860. The DCI format information bits are de-masked by an XOR operation unit 870 with an RNTI 880 (when applicable) and a CRC check is performed by CRC unit 890. When the CRC check succeeds (check-sum is zero), the DCI format information bits are considered to be valid (at least when corresponding information is valid). When the CRC check does not succeed, the DCI format information bits are considered to be invalid.

As described in more detail below, the encoding flowchart 700 and decoding flowchart 800 can be implemented in a BS and UE, respectively, such as BS 102 in FIG. 2 and UE 116 in FIG. 3, for communicating information over a networked computing system for UE antenna adaptation for power saving in C-DRX. In one embodiment, antenna adaptation can be applied to RX antennas for DL data reception based on per BWP determined maximum MIMO layer. In another embodiment, antenna adaptation can be applied to TX antennas for UL data transmission based on per BWP determined maximum MIMO layer or maximum transmit antenna ports.

UE Adaptation on Maximum MIMO Layers for DL Data Reception

An embodiment of this disclosure considers UE adaptation on maximum MIMO layers for DL data reception. A UE can be provided with maximum MIMO layer for a DL BWP with index i, denoted as $N^{\wedge}maxMLDL\_i$ in this disclosure. The UE can assume the MIMO layer for DL data reception, such as PDSCH or PDCCH, in the DL BWP is no larger than $N^{\wedge}maxMLDL\_i$.

Figure 9:
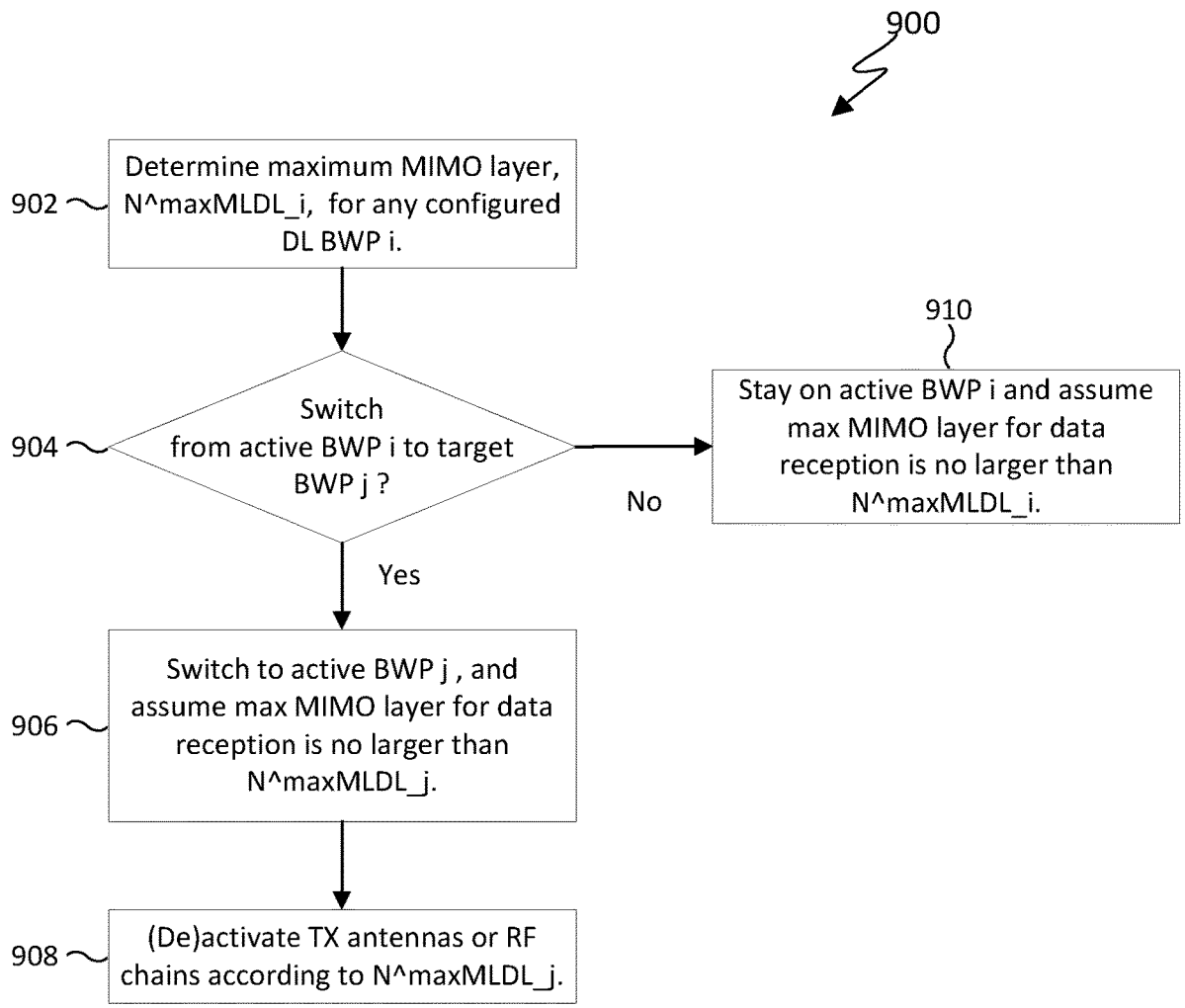
FIG. 9 illustrates a flowchart for adaptation on receive (RX) antennas based on dynamic adaptation on maximum MIMO layer through BWP switching in accordance with various embodiments of this disclosure.

FIG. 9 illustrates a flowchart for adaptation on TX antennas based on dynamic adaptation on maximum MIMO layer through BWP switching in accordance with various embodiments of this disclosure. Operations of flowchart 900 can be implemented in a UE such as UE 116 in FIG. 3.

Flowchart 900 begins at operation 902 by determining a maximum MIMO layer, $N^{\wedge}maxMLDL\_i$, for any configured DL BWL i.

In operation 904, a determination is made whether to switch from an active BWP i to a target BWP j. If the determination is made to switch from the active BWP i to the target BWP j, then flowchart 900 proceeds from operation 904 to operation 906 and switches to an active BWP j and assumes that the maximum MIMO layer for data reception, e.g., PDSCH or PDCCH, is no larger than $N^{\wedge}maxMLDL\_j$. In operation 908, RX antennas or RF chains are activated or deactivated according to $N^{\wedge}maxMLDL\_j$. The number of activated RX antennas or RX antenna ports or RX RF chains is at least $N^{\wedge}maxMLDL\_j$. For example, UE only activates $N^{\wedge}maxMLDL\_j$ RX antennas or RX RF chains.

Returning back to operation 904, if the determination is made not to switch from active BWP i to target BWP j, then flowchart 900 proceeds to operation 910 and stays on the active BWP i and assumes that the MIMO layer for data reception, e.g., PDSCH or PDCCH, is no larger than $N^{\wedge}maxMLDL\_i$.

When a UE is configured with a maximum MIMO layers for a DL BWP with index/ID i, i.e. $N^{\wedge}maxMLDL\_i$, the UE can determine the maximum rank indicator (RI) for a channel state information (CSI) report in the DL BWP according to one of the following examples.

Example 1. The UE can assume the maximum RI for a CSI report is same as $N^{\wedge}maxMLDL\_i$. The UE is not expected to report a RI for any CSI report in the DL BWP i larger than $N^{\wedge}maxMLDL\_i$.

Example 2. The UE can assume the maximum RI for any CSI report in the DL BWP i is same as $N^{\wedge}maxLayersDL$, where $N^{\wedge}maxLayersDL$ is the maximum value among all configured DL BWPs, such that $N^{\wedge}maxLayersDL=\max\{N^{\wedge}maxMLDL\_i\}$. The UE is not expected to report a RI for any CSI report in DL BWP i larger than $N^{\wedge}maxLayersDL$.

Example 3. The UE can assume the RI for any CSI report in the DL BWP i can be a value within a range regardless of the configuration of $N^{\wedge}maxMLDL\_i$. For example, RI can be any value from {1, 2, 3, 4, 5, 6, 7, 8}. In another example, RI can be any positive integer value no larger than maximum RI or MIMO layer for PDSCH determined by UE capability.

For a UE in an active BWP i with a maximum MIMO layer $N^{\wedge}maxMLDL\_i$, if $N^{\wedge}maxMLDL\_i$ is different than $N^{\wedge}maxMLDL\_j$, where $N^{\wedge}maxMLDL\_j$ is the maximum MIMO layer for initial DL BWP, the UE is not expected to be indicated with TCI state associated with the SS/PBCH in the initial DL BWP with QCL-TypeD.

A UE can determine the maximum MIMO layers for a DL BWP with index/ID i, i.e. $N^{\wedge}maxMLDL\_i$, through any of the following approaches.

Approach 1. In the first approach of determination of $N^{\wedge}maxMLDL\_i$, the UE can receive $N^{\wedge}maxMLDL\_i$ together with the configuration of the DL BWP i through RRC signaling. When the UE is also provided with maximum MIMO layer to be used for all BWPs of the serving cell by RRC parameter, i.e. maxMIMO-Layers in PDSCH-ServingCellConfig. The UE can assume $N^{\wedge}maxMLDL\_i$ overwrites maxMIMO-Layers for the DL BWP i.

Approach 2. In second approach of determination of $N^{\wedge}maxMLDL\_i$, if the UE is provided with maximum MIMO layer to be used for PDSCH in all BWPs of the serving cell by RRC parameter, i.e., maxMIMO-Layers in PDSCH-ServingCellConfig in REF 6, the network sets maximum MIMO layers for any DL BWP with ID i of the serving cell, denoted as $N^{\wedge}maxMLDL\_i$ to the same value as maxMIMO-Layers. In this case, if the RRC parameter of maximum MIMO layers to be used for PDSCH in all BWPs of the serving cell, i.e. maxMIMO-Layers, is present, the UE can assume the maximum MIMO layer for any configured DL BWP has the same value as maxMIMO-Layers.

Approach 3. In third approach of determination of $N^{\wedge}maxMLDL\_i$, $N^{\wedge}maxMLDL\_i$ can be defined in the specification of the system operation, for example, $N^{\wedge}maxMLDL\_i=1$ for initial DL BWP or default DL BWP.

Approach 4. In fourth approach of determination of $N^{\wedge}maxMLDL\_i$, $N^{\wedge}maxMLDL\_i$ can be predetermined according to a UE's assistance information or UE capability, for example, $N^{\wedge}maxMLDL\_i$ for initial DL BWP or default DL BWP can be the preferred maximum MIMO layer reported from UE.

A UE can transmit its preferred maximum MIMO layer for DL data reception to a gNB. Some non-limiting examples for reporting maximum MIMO layer by the UE are described below. The reported maximum MIMO layer for DL data reception can be used as assistance information or be applied directly as UE capability.

Example 1. In one example for reporting maximum MIMO layer for DL data reception, the UE reports preferred maximum MIMO layer for a default BWP or initial BWP or default DL BWP or initial DL BWP.

Example 2. In another example for reporting maximum MIMO layer for DL data reception, the UE reports a preferred maximum MIMO layer per DL BWP. In this case, UE reports both the preferred maximum MIMO layer and corresponding DL BWP index.

Example 3. In another example for report maximum MIMO layer for DL data reception, the UE reports N>=1 preferred maximum MIMO layers for DL data reception, where N<=configured DL BWPs.

EXAMPLE 4. In yet another example for reporting maximum MIMO layer for DL data reception, the UE reports a preferred maximum MIMO layer for an active DL BWP.

UE Adaptation on Maximum MIMO Layers for UL Data Transmission

Another embodiment of this disclosure considers UE adaptation on maximum MIMO layers for UL data transmission. A UE can be provided with maximum MIMO layer for UL data transmission in a UL BWP with index i, denoted as N^maxMLUL_i in this disclosure. The UE assume the MIMO layer for UL data transmission, such as PUSCH or PUCCH, in the UL BWP is no larger than N^maxMLUL_i.

Figure 10:
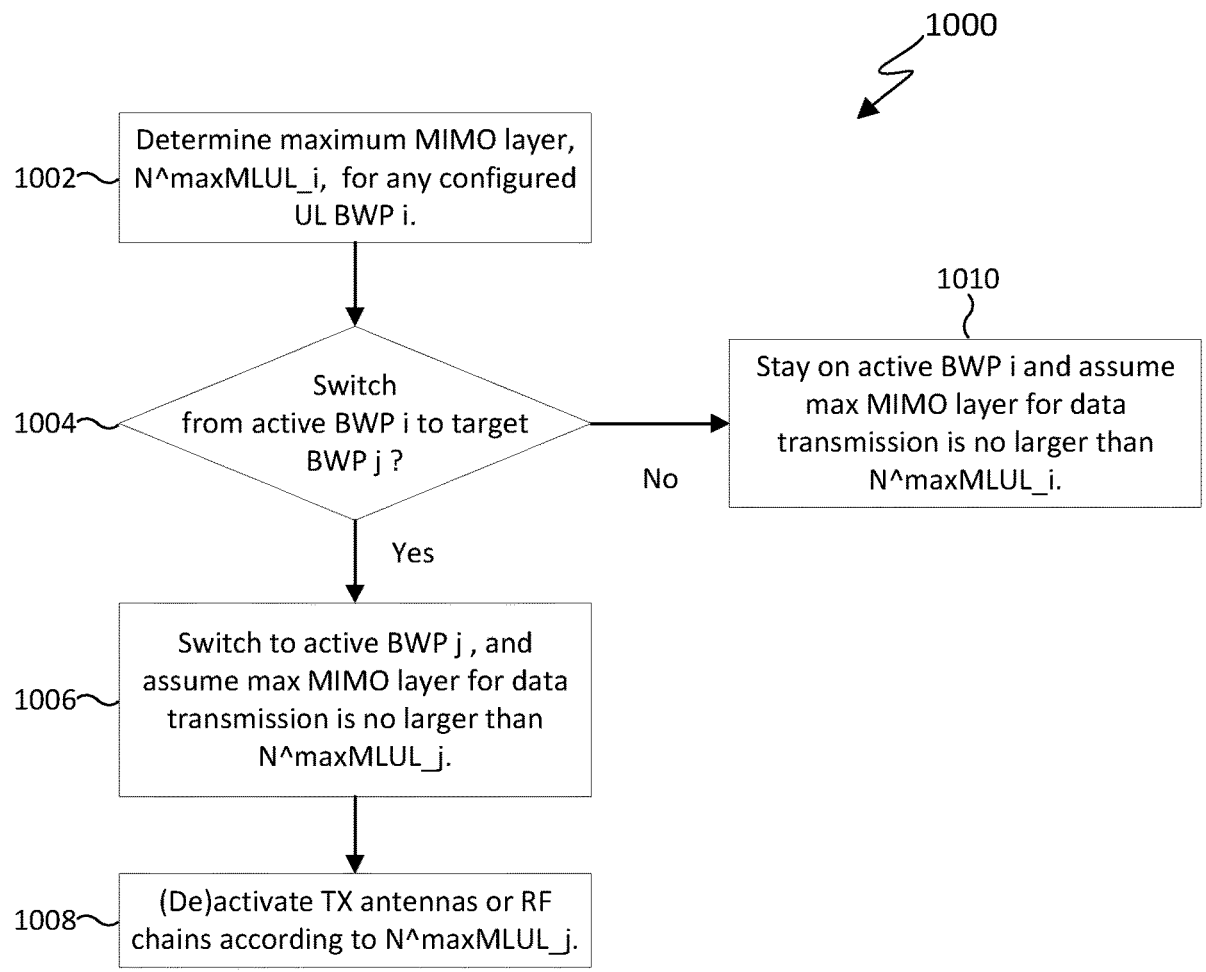
FIG. 10 illustrates a flowchart for adaptation on transmit (TX) antennas based on dynamic adaptation on maximum MIMO layer through BWP switching in accordance with various embodiments of this disclosure.

FIG. 10 illustrates a flowchart for adaptation on transmit (TX) antennas based on dynamic adaptation on maximum MIMO layer through BWP switching in accordance with various embodiments of this disclosure. Operations in flowchart 1000 can be implemented in a UE, such as UE 116 in FIG. 3.

Flowchart 1000 begins at operation 1002 by determining a maximum MIMO layer, N^maxMLUL_i, for any configured UL BWL i. In operation 1004, a determination is made whether to switch from an active BWP i to a target BWP j. If the determination is made to switch from the active BWP i to the target BWP j, then flowchart 1000 proceeds to operation 906 and switches to the active BWP j and assumes that the maximum MIMO layer for UL data transmission, such as PUSCH or PUCCH is no larger than N^maxMLUL_j associated with UL BWP j. In operation 1008, TX antennas, TX antenna ports, or TX RF chains are activated or deactivated according to N^maxMLUL_j. The number of activated TX antennas or TX antenna ports or TX RF chains is at least N^maxMLUL_j. For example, UE only activates N^maxMLUL_j TX antennas or TX RF chains.

Returning to operation 1004, if the determination is made not to switch from the active BWP i to the target BWP j, then flowchart 1000 proceeds to operation 1010 and stays on the active BWP i and assumes that the maximum MIMO layer for UL data transmission, such as PUSCH or PUCCH is no larger than N^maxMLUL_i associated with UL BWP i.

For a UL BWP with index i, based on the determined maximum MIMO layer for UL data transmission, i.e. N^maxMLUL_i in the UL BWP i, the UE can assume any of the following:

for SRS transmission for non-codebook based PUSCH, the UE can assume the number of SRS resources is no larger than N^maxMLUL_i when the number of SRS port per SRS resource is 1;

for SRS transmission for non-codebook based PUSCH, the UE can assume the aggregated number of SRS ports across SRS resources is no larger than N^maxMLUL_i;

for codebook based PUSCH transmission, the UE can assume maximum rank for codebook based PUSCH is same as N^maxMLUL_i;

for SRS transmission for codebook based PUSCH, the UE can assume the number of SRS ports per SRS resource is no larger than N^maxMLUL_i;

for SRS transmission used for antenna switching, the UE can assume the number of SRS ports per SRS resource is no larger than N^maxMLUL_i;

for SRS transmission used for antenna switching, the UE can assume the number of SRS ports per SRS resource is no larger than N^maxMLUL_i;

for SRS transmission used for beam management, the UE can assume the number of SRS ports per SRS resource is no larger than N^maxMLUL_i; and for SRS transmission, the UE can assume the number of SRS ports per SRS resource is no larger than N^maxMLUL_i.

A UE can determine the maximum MIMO layers for a UL BWP with index/ID i, i.e. N^maxMLUL_i, through any of the following approaches.

In the first approach of determination of N^maxMLUL_i, when the UE is provided with maximum rank through RRC signaling, i.e. maxRank in PUSCH-Config as described in REF 6, the UE can assume the maximum MIMO layer for PUSCH in the UL BWP i is same as maxRank, such that N^maxMLUL_i=maxRank.

In the second approach of determination of N^maxMLUL_i, N^maxMLUL_i can be configured by higher layer signaling for the UL BWP i. When the UE is also provided with maximum MIMO layer to be used for PUSCH in all BWPs of the serving cell by RRC parameter, i.e. maxMIMO-Layers in PUSCH-ServingCellConfig, as described in REF 6. The UE can assume N^maxMLUL_i overwrites maxMIMO-Layers for the UL BWP i.

In the third approach of determination of maximum MIMO layers for PUSCH in a UL BWP i, if the UE is provided with maximum MIMO layer to be used for PUSCH in all BWPs of the serving cell by RRC parameter, i.e. maxMIMO-Layers in PUSCH-ServingCellConfig as described in REF 6, the network sets maximum MIMO layers for any UL BWP with ID i of the serving cell, N^maxMLUL_i, to the same value as maxMIMO-Layers. In this case, if the RRC parameter of maximum MIMO layers to be used for PUSCH in all BWPs of the serving cell, i.e. maxMIMO-Layers, is present, the UE can assume the maximum MIMO layer for any configured UL BWP has the same value as maxMIMO-Layers.

In the fourth approach of determination of N^maxMLUL_i, N^maxMLUL_i can be predetermined accordingly to the UE's assistance information or report. For example, N^maxMLUL_i for the initial BWP or default BWP can be the maximum MIMO layer for data transmission reported by UE.

In the fifth approach of determination of N^maxMLUL_i, N^maxMLUL_i can be defined in the specification of the system operation. For example, N^maxMLUL_i for the initial BWP or default BWP can be a fixed value, e.g. 1.

In the sixth approach of determination of N^maxMLUL_i, N^maxMLUL_i=min(x, y), where x is the maximum number of SRS ports per SRS resource in the UL BWP i, and y is the maximum number of SRS ports per SRS resource among all SRS resources for codebook based PUSCH or y is the aggregated number of SRS ports across SRS resources for non-codebook based PUSCH transmission.

A UE can transmit its preferred maximum MIMO layer for UL data transmission to gNB. The reported maximum MIMO layer can be used as assistance information or be applied directly as UE capability. Non-limiting examples of reporting maximum MIMO Layer are provided below.

In one example for reporting maximum MIMO layer for UL data transmission, the UE reports a preferred maximum MIMO layer for a default BWP or initial BWP or default UL BWP or initial UL BWP.

In another example for reporting maximum MIMO layer for UL data transmission, the UE reports a preferred maximum MIMO layer per UL BWP. In this case, UE reports both the preferred maximum MIMO layer and corresponding UL BWP index.

In another example for reporting maximum MIMO layer for UL data transmission, the UE reports N>=1 preferred maximum MIMO layer, where N<=configured UL BWPs.

In yet another example for reporting maximum MIMO layer for UL data transmission, the UE reports a preferred maximum MIMO layer for active UL BWP.

UE Adaptation on TX Antenna Ports

Yet another embodiment of this disclosure considers UE adaptation on transmit (TX) antenna ports for UL data transmission.

In the first approach of UE adaptation on TX antenna ports, a UE can be provided with maximum number of TX antenna ports for a UL BWP with index i, denoted as N^maxTXports_i in this disclosure. The UE assume the number of TX antenna ports for UL data transmission in the UL BWP i, such as SRS, PUSCH, is no larger than N^maxTXports_i.

Figure 11:
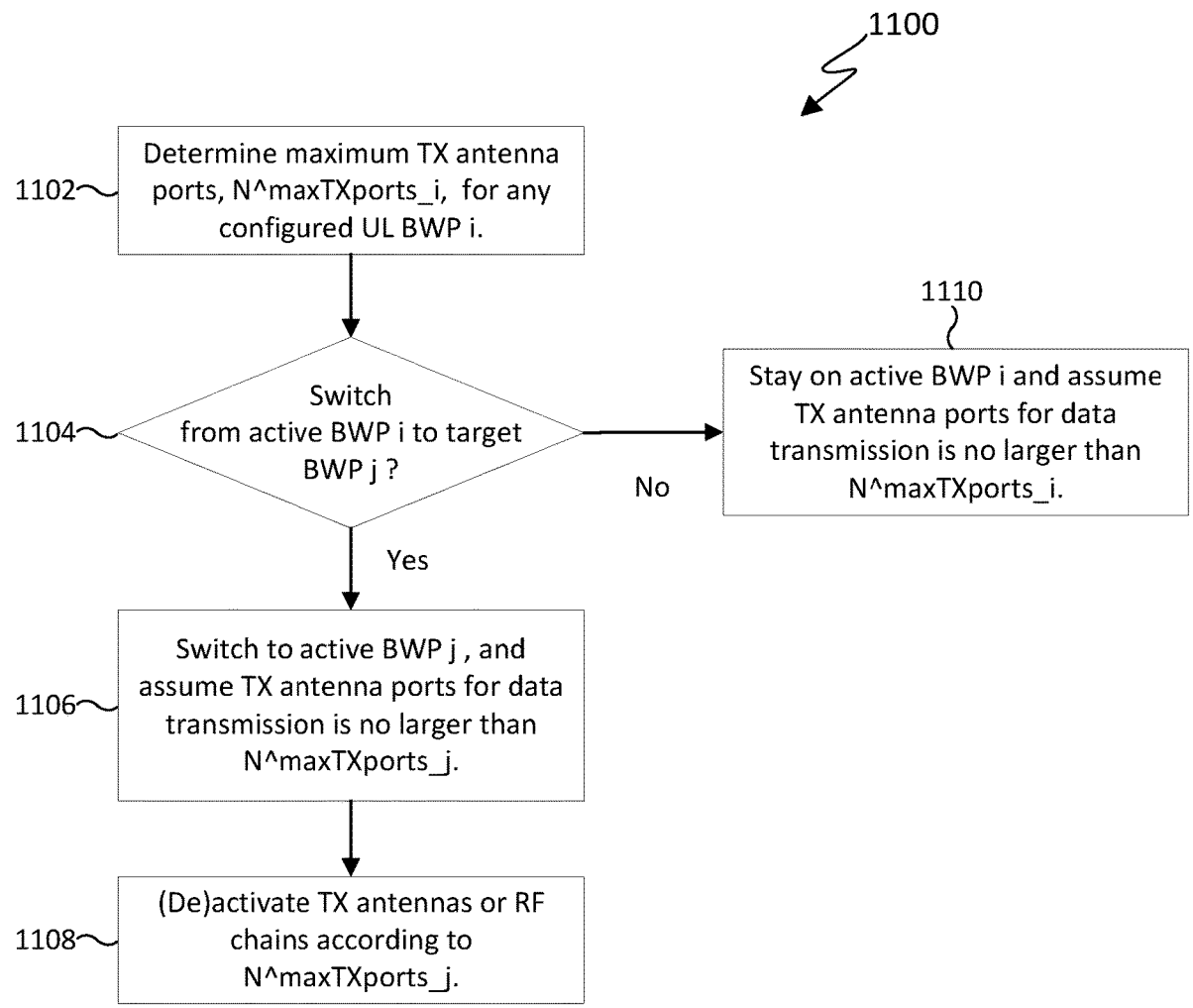
FIG. 11 illustrates a flowchart for adaptation on TX antennas based on dynamic adaptation on maximum TX antenna ports through BWP switching in accordance with various embodiments of this disclosure.

FIG. 11 illustrates a flowchart for adaptation on TX antennas based on dynamic adaptation on maximum TX antenna ports through BWP switching in accordance with various embodiments of this disclosure. Operations of flowchart 1100 can be implemented in a UE, such as UE 116 in FIG. 3.

Flowchart 1100 begins at operation 1102 by determining maximum TX antenna ports, N^maxTXports_i, for any configured UL BWL i. In operation 1104 a determination is made whether to switch from an active BWP i to a target BWP j. If the determination is made to switch from the active BWP i to the target BWP j, then flowchart 1100 proceeds to operation 1106 and switches to the active BWP j and assumes the maximum TX antenna ports for UL data transmission, such as PUSCH or PUCCH is no larger than N^maxTXports_j associated with UL BWP j.

In operation 1108, the TX antennas or TX antenna ports or TX RF chains can be activated or deactivated according to the N^maxTXports_j. The number of activated TX antennas or TX antenna ports or TX RF chains is at least N^maxTXports_j. For example, UE only activates N^maxTXports_j TX antennas or TX RF chains.

Returning to operation 1104, if the determination is made not to switch from the active BWP i to the target BWP j, then flowchart 1100 proceeds from operation 1104 to operation 1110 and stays on the active BWP i and assumes that the TX antenna ports for data transmission, e.g., PUSCH or PUCCH, is no larger than N^maxTXports_i.

For the UL BWP with index i, when the UE determines the maximum number of TX antenna ports for the UL BWP, N^maxTXports_i, the UE can assume any of the following:

for SRS transmission used for codebook based PUSCH, the UE can assume the number of SRS ports per SRS resource is no larger than N^maxTXports_i;

for SRS transmission used for non-codebook based PUSCH, the UE can assume the number of SRS resources is no larger than N^maxTXports_i, when number of SRS port for a single SRS resource is 1;

for SRS transmission for non-codebook based PUSCH, the UE can assume the aggregated number of SRS ports across SRS resources is no larger than N^maxTXports_i;

for SRS transmission used for antenna switching or beam management, the UE can assume the number of SRS ports per SRS resource is no larger than N^maxTXports_i;

for SRS transmission, the UE can assume the number of SRS ports per SRS resource multiplies the number of SRS resources is no larger than N^maxTXports_i, for any SRS resource set in the UL BWP i; and for codebook based PUSCH, the UE can assume the max rank, i.e. maxRank in PUSCH-Config in REF 6, is no larger than N^maxTXports_i.

A UE can determine the maximum TX antenna ports in a UL BWP with index/ID i, i.e. N^maxTXports_i, through any of the following approaches.

In the first approach of determination of N^maxTXports_i, the UE assume N^maxTXports_i is the maximum value of the number of SRS ports per SRS resource configured in the UL BWP.

In the second approach of determination of N^maxTXports_i, the UE assume N^maxTXports_i is the maximum value of the aggregated number of SRS ports over all configured SRS resource per SRS resource set in the UL BWP.

In the third approach of determination of N^maxTXports_i, a UE is provided with maximum number of SRS ports per SRS resource for the UL BWP i, through higher layer signaling, and the UE can assume N^maxTXports_i equals to the maximum number of SRS ports per SRS resource configured in the UL BWP.

In the fourth approach of determination of N^maxTXports_i, a UE is provided with maximum number of SRS ports per SRS resource and the maximum number of SRS resources for the UL BWP i, through higher layer signaling. In one sub-example, the UE can assume N^maxTXports_i equals to the maximum number of SRS ports per SRS resource multiplies the maximum number of SRS resources.

In the fifth approach of determination of N^maxTXports_i, N^maxTXports_i=max(x, y), where x is the maximum number of SRS ports per SRS resource in the UL BWP i, and y is the number of SRS ports in a single resource when the UL BWP is associated with codebook based PUSCH transmission, otherwise y is the aggregated number of SRS ports across all SRS resources when the UL BWP is associated with non-codebook based PUSCH transmission.

In the sixth approach of determination of N^maxTXports_i, N^maxTXports_i=max(x, y), where x is the maximum number of SRS ports per SRS resource in the UL BWP i, and y is the maximum number of SRS ports per SRS resource among all the SRS resources for codebook based PUSCH, or y is the aggregated number of SRS ports across SRS resources for non-codebook based PUSCH.

A UE can transmit its preferred maximum TX antenna ports for UL data transmission to gNB. The reported maximum TX antenna ports for UL data transmission can be used as assistance information or be applied directly as UE capability. Reporting of the TX antenna ports can be accomplished by any one of the following non-limiting examples.

In one example for reporting TX antenna ports for UL data transmission, the UE reports preferred maximum TX antenna ports for a default BWP or initial BWP or default UL BWP or initial UL BWP.

In another example for reporting TX antenna ports for UL data transmission, the UE reports a preferred maximum TX antenna ports per UL BWP. In this case, UE reports both the preferred TX antenna ports and corresponding UL BWP index.

In another example for reporting maximum TX antenna ports for UL data transmission, the UE reports N>=1 preferred TX antenna ports, where N<=configured UL BWPs.

In yet another example for reporting maximum TX antenna ports for UL data transmission, the UE reports a preferred maximum TX antenna ports for active UL BWP.

In the second approach of UE adaptation on TX antenna ports, a UE can be provided with maximum number of SRS ports per SRS resource, denoted as X1_i, or maximum number of SRS resources, denoted as X2_i, for a configured UL BWP with index i, through higher layer signaling.

For a UL BWP i, when a UE is provided with a maximum number of SRS ports per SRS resource, X1_i, the UE can assume any of the following:

for SRS transmission for codebook based PUSCH in the UL BWP i, the UE can assume the number of SRS ports per SRS resource is no larger than X1 in the UL BWP; and for SRS transmission in the UL BWP i, the UE can assume the number of SRS ports per SRS resource is no larger than X1 in the UL BWP.

For a UL BWP i, when a UE is provided with a maximum number of SRS resources, X2_i, the UE can assume any of the following:

for SRS transmission for non-codebook based PUSCH in the UL BWP i, the UE can assume the number of SRS resources is no larger than X2_i; and for SRS transmission in the UL BWP i, the UE can assume the number of SRS resources is no larger than X2_i in the UL BWP.

A UE can transmit its preferred maximum number of SRS ports per SRS resource or maximum SRS resources to gNB. The reported maximum number of SRS ports per SRS resource or maximum SRS resources can be used as assistance information or be applied directly as UE capability. Non-limiting examples of reporting the maximum number of SRS ports are provided below.

In one example for reporting maximum number of SRS ports per SRS resource or maximum SRS resources, the UE reports preferred maximum number of SRS ports per SRS resource or maximum SRS resources for a default BWP or initial BWP or default UL BWP or initial UL BWP.

In another example for reporting maximum number of SRS ports per SRS resource or maximum SRS resources, the UE reports a preferred maximum number of SRS ports per SRS resource or maximum SRS resources per UL BWP. In this case, UE reports both the preferred maximum number of SRS ports per SRS resource or maximum SRS resources and corresponding UL BWP index.

In another example for reporting maximum number of SRS ports per SRS resource or maximum SRS resources, the UE reports N>=1 preferred maximum number of SRS ports per SRS resource or maximum SRS resources, where N<=configured UL BWPs.

In yet another example for reporting maximum number of SRS ports per SRS resource or maximum SRS resources, the UE reports a preferred maximum number of SRS ports per SRS resource or maximum SRS resources for active UL BWP.

Management of UE Operations During C-DRX

A PDCCH based power saving signal/channel can trigger a UE to "wake up" for next concurrence(s) of the drx-onDurationTimer. For example, a UE can be configured by a gNB to receive, outside of the DRX Active Time for the UE, a PDCCH that provides a DCI format indicating to the UE whether or not to monitor PDCCH candidates in associated search space sets in one or more of the subsequent DRX ON duration(s). For example, when the UE does not detect the DCI format, the UE does not monitor PDCCH in one or more (as configured by higher layers) DRX ON duration(s).

Various embodiments describe UE operation when a UE receives a power saving signal/channel, such as for example a PDCCH outside of DRX Active Time that provides a DCI format, indicating to the UE to skip PDCCH monitoring in one or more DRX ON duration(s) or to skip any transmission and reception in one or more DRX ON duration(s). Alternatively, the indication can be implicit such that a default UE behavior can be to skip PDCCH monitoring unless the UE receives an indication to monitor PDCCH for next one or more DRX ON duration(s) (or does not receive an indication to monitor PDCCH). The exact mechanism for how a UE is provided an indication to operate in a power saving mode, such as to skip PDCCH monitoring, in next one or more DRX ON durations is not material to the embodiments of this disclosure and the signaling can be generally referred to as being provided by a power saving signal/channel.

Figure 12:
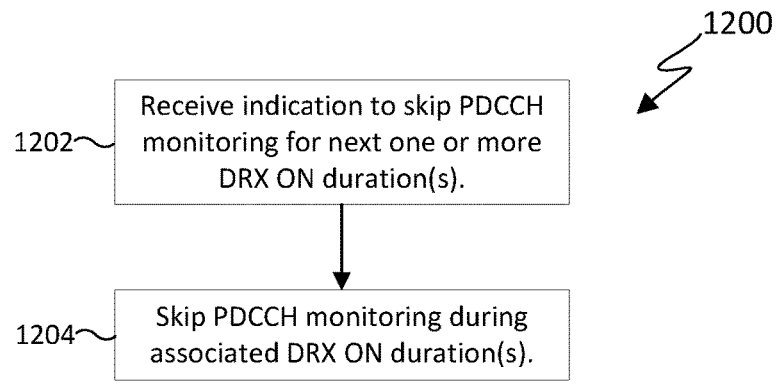
FIG. 12 illustrates a flowchart for receiving a PDCCH-based power saving signal/channel in accordance with various embodiments of this disclosure.

FIG. 12 illustrates a flowchart for receiving a PDCCH-based power saving signal/channel in accordance with various embodiments of this disclosure. Operations of flowchart 1200 can be implemented in a UE, such as UE 116 in FIG. 3.

Flowchart 1200 begins at operation 1202 by receiving an indication to skip PDCCH monitoring for a next one or more DRX ON duration(s). For example, the UE can be configured to receive PDCCH at a configured monitoring occasion outside the DRX Active Time in RRC_CONNECTED state and an associated DCI format can indicate to the UE whether or not to skip PDCCH monitoring for next one or more DRX ON duration(s). Thereafter, in operation 1204, PDCCH monitoring is skipped during the associated DRX ON duration(s).

While the ability of a UE TO skip PDCCH monitoring in a next one or more DRX ON duration(s) is defined, exceptions can be necessary for proper UE operation. Some exemplary scenarios relating to those exceptions are described in more detail in the following disclosure.

UE Behavior and PDCCH Monitoring

An embodiment of this disclosure considers a UE operation related to PDCCH monitoring when the UE receives an indication to skip PDCCH monitoring for a next one or more DRX ON duration(s) associated with RRC_CONNECTED state discontinuous reception (C-DRX) operation.

When a UE receives (or does not receive) a power saving signal/channel, such as for example a PDCCH outside of DRX Active Time that provides a DCI format indicating to the UE to skip PDCCH monitoring for one or more DRX ON duration(s), the UE can skip PDCCH monitoring at least for DCI formats with CRC scrambled by a Cell RNTI (C-RNTI) in UE specific search space (USS) set(s). However, in some embodiments, the UE is still expected to monitor PDCCH candidates in the associated DRX ON duration(s) for any of the following cases regardless of the indication for skipping PDCCH monitoring.

Case 1: The UE is expected to monitor PDCCH in a Type0-PDCCH common search space (CSS) for DCI formats with CRC scrambled by System Information RNTI (SI-RNTI). This enables the UE to obtain system information updates. This is beneficial for a system operation even for UEs that do not have data to receive or transmit during a DRX ON duration period (and are indicated to skip PDCCH monitoring) because system information is typically updated at a much longer time interval than a DRX ON duration period.

Case 2: The UE is expected to monitor PDCCH in a Type0A-PDCCH CSS for DCI formats with CRC scrambled by SI-RNTI. A reason is similar as for monitoring PDCCH in a Type0-PDCCH CSS.

Case 3: The UE is expected to monitor PDCCH in a Type1-PDCCH CSS for DCI formats with CRC scrambled by Random Access RNTI (RA-RNTI) or Temporary Cell RNTI (TC-RNTI). As is subsequently described, this is beneficial for a UE expecting a response to a PRACH that the UE transmitted to request PUSCH scheduling, establish synchronization by being provided a timing advance command in a random access response (RAR), and so on.

Case 4: The UE is expected to monitor PDCCH in a USS for DCI formats with CRC scrambled by Configured Scheduling RNTI (CS-RNTI).

Case 5: The UE is expected to monitor PDCCH in a USS for DCI formats with CRC scrambled by Modulating Coding Scheme Cell RNTI (MCS-C-RNTI) or, in general, for a DCI formats having a CRC scrambled by an RNTI associated with a service type having low latency requirements. The search spaces or the RNTIs where the UE is expected to monitor PDCCH (regardless of an indication by a power saving signal/channel that is inapplicable for those search spaces) can be configured to the UE by higher layers.

Figure 13:
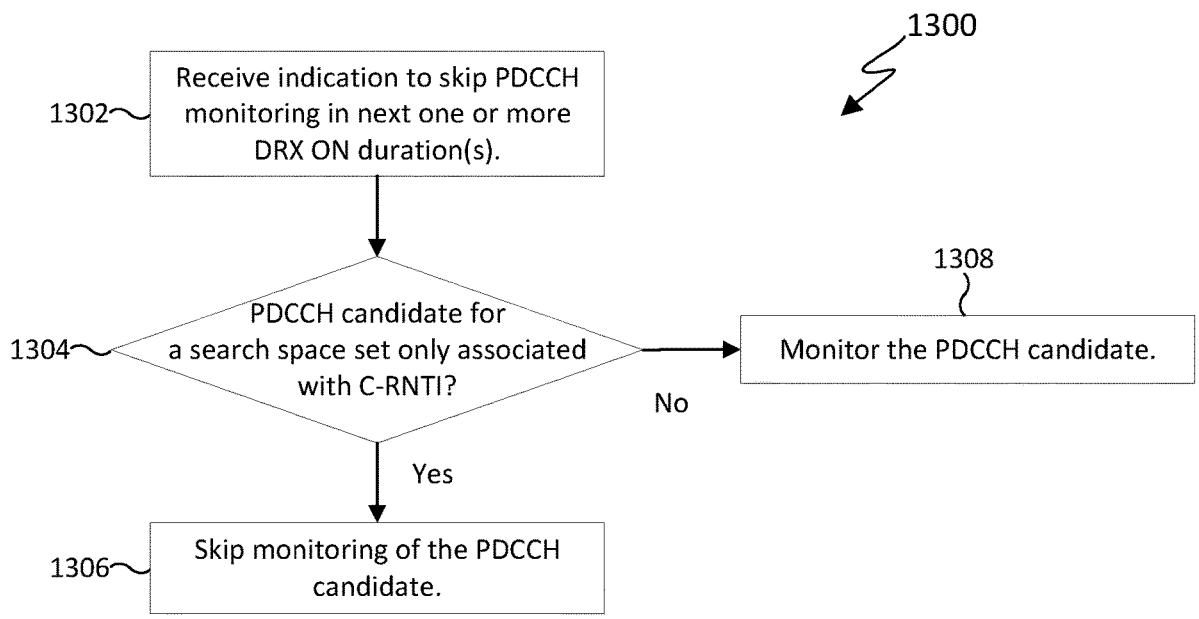
FIG. 13 illustrates a flowchart for PDCCH monitoring when a power saving signal/channel indicates skipping PDCCH monitoring for a next one or more DRX ON duration(s) in accordance with various embodiments of this disclosure.

FIG. 13 illustrates a flowchart for PDCCH monitoring when a power saving signal/channel indicates skipping PDCCH monitoring for a next one or more DRX ON duration(s) in accordance with various embodiments of this disclosure. Operations of flowchart 1300 can be implemented in a UE, such as UE 116 in FIG. 3.

Flowchart 1300 begins at operation 1302 by receiving an indication to skip PDCCH monitoring in a next one or more DRX ON duration(s) outside DRX Active Time in RRC_CONNECTED state 501. In operation 1304, a determination is made as to whether the PDCCH candidate for a search space set is only associated with a C-RNTI. If the PDCCH candidate for the search space set is only associated with a C-RNTI, then flowchart 1300 proceeds to operation 1306 where monitoring of the PDCCH candidate is skipped. However, if the PDCCH candidate for the search space set is not only associated with a C-RNTI in operation 1304, then flowchart 1300 proceeds to operation 1308 and the PDCCH candidate is monitored even though the drx-onDurationTimer is not running.

UE Behavior and Scheduling Request (SR) Transmissions

Another embodiment of this disclosure considers UE operation related to SR transmission when the UE receives an indication to skip PDCCH monitoring for next one or more DRX ON duration(s) associated with RRC_CONNECTED state discontinuous reception (C-DRX) operation.

In one or more embodiments, a UE can transmit a (positive) SR within the associated DRX ON duration(s) when the UE receives (or does not receive) a power saving signal/channel, such as for example a PDCCH outside of DRX Active Time that provides a DCI format indicating to the UE to skip PDCCH monitoring for one or more DRX ON duration(s). For example, the UE can transmit a positive SR in PUCCH resources that the UE is configured for SR transmission even though the drx-onDurationTimer is not running.

After the UE transmits a positive SR, the SR overrides the indication for skipping PDCCH monitoring at least for DCI formats scheduling a PUSCH transmission. The UE can restart a timer associated with DRX Active Time, for example drx-onDurationTimer or drx-InactivityTimer, and start monitoring PDCCH at least for DCI formats scheduling a PUSCH transmission in corresponding USS set(s). In another approach, the UE can also monitor PDCCH for DCI formats scheduling a PDSCH reception when the DCI formats have a same size as DCI format scheduling a PUSCH transmission. In another approach, the UE can perform full PDCCH monitoring for all DCI formats after the UE transmits a positive SR. The same can apply when the UE transmits a PRACH serving as a SR. The UE can expect to detect a DCI format, for example DCI format 0_0 or DCI format 0_1 with CRC scrambled by C-RNTI, for scheduling a PUSCH transmission when the positive SR overrides the indication for the UE to skip PDCCH monitoring in the DRX ON duration period. Alternatively, a serving gNB can indicate to the UE to monitor PDCCH for DRX ON duration(s) in a next monitoring occasion of a PDCCH providing the indication. The UE can also by default monitor PDCCH at next DRX ON duration(s) and can skip reception of a power saving/signal channel providing an indication for whether or not the UE monitors PDCCH at the next DRX ON duration(s).

The UE can determine whether or not to transmit a positive SR when the UE receives an indication for skipping PDCCH monitoring in next DRX ON duration(s) or whether or not a positive SR can override an indication for skipping PDCCH monitoring through any of the following methods.

Method 1: The system specification can define whether or not a UE can transmit a positive SR in next DRX ON durations when the UE receives an indication for skipping PDCCH monitoring in next DRX ON duration(s) or whether or not a positive SR can override an indication for skipping PDCCH monitoring. For example, it can be specified by the system operation that a UE can transmit a positive SR in next DRX ON durations when the UE receives an indication for skipping PDCCH monitoring in the next DRX ON duration(s), and a positive SR can override an indication for skipping PDCCH monitoring, and UE can starts monitoring PDCCH after transmitting a SR.

Method 2: Higher layer signaling provided to the UE can dictate whether or not a UE can transmit a positive SR in next DRX ON durations when the UE receives an indication for skipping PDCCH monitoring in next DRX ON duration(s) or whether or not a positive SR can override an indication for skipping PDCCH monitoring. For example, the configuration of a search space set for monitoring PDCCH that provides a DCI format indicating whether or not to skip PDCCH monitoring in next DRX ON duration(s) can include an indication for whether or not a positive SR transmission overrides the indication for skipping PDCCH monitoring. In another example, the configuration of PUCCH resource for SR transmission can include an indication for whether or not UE can still transmit a positive SR in next DRX ON duration(s) when the UE receives an indication for skipping PDCCH monitoring in the DRX ON duration(s).

Method 3: The physical layer signal/channel to indicate the UE to skip PDCCH monitoring in next DRX ON duration(s) can also include an indication for whether or not UE can still transmit a positive SR or whether or not a positive SR transmission overrides the indication for skipping PDCCH monitoring in the next DRX ON duration(s).

Figure 14:
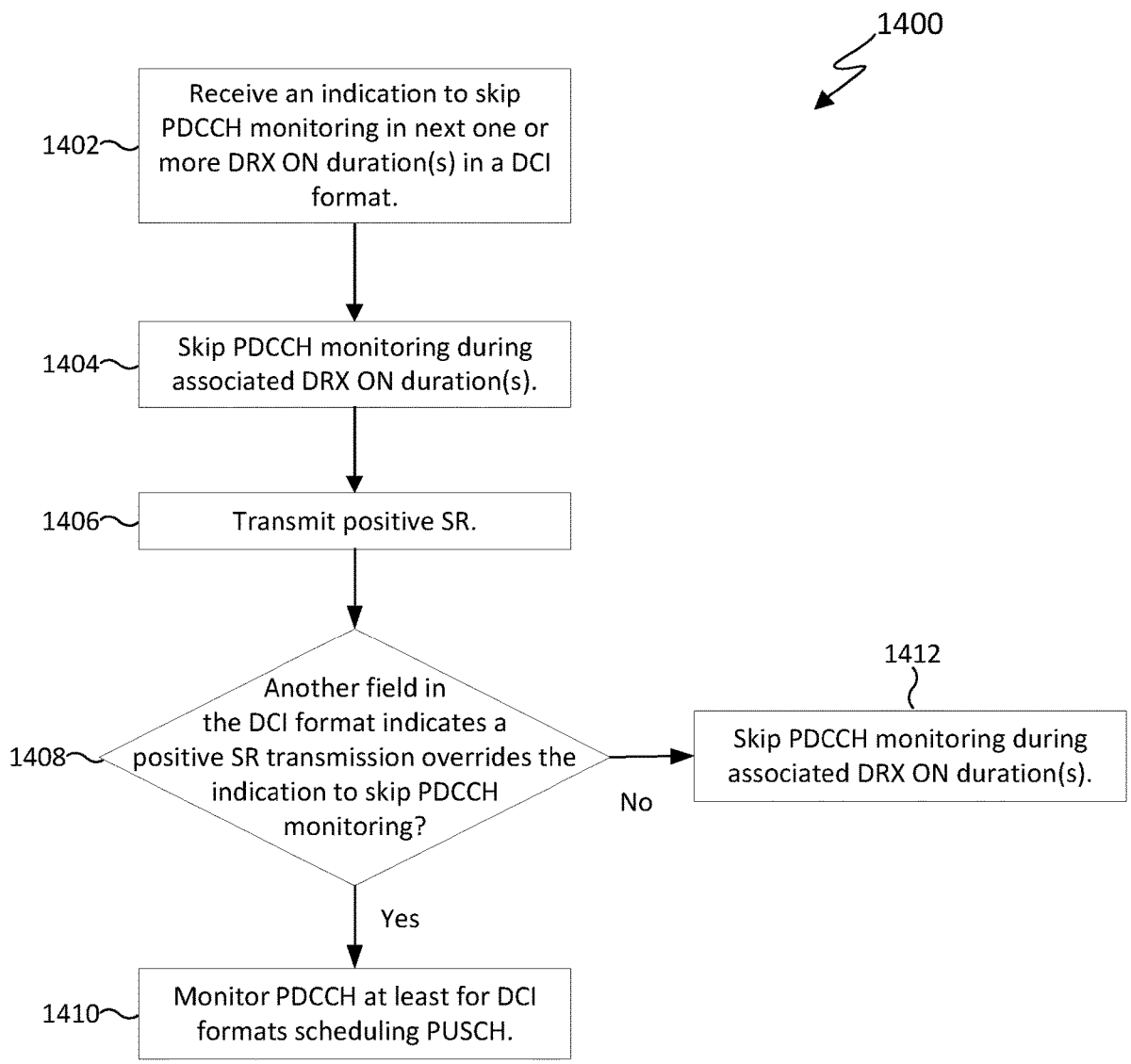
FIG. 14 illustrates a flowchart for PDCCH monitoring before and after a positive scheduling request (SR) transmission after a prior indication to skip PDCCH monitoring for a next one or more DRX ON duration(s) in accordance with various embodiments of this disclosure.

FIG. 14 illustrates a flowchart for PDCCH monitoring before and after a positive scheduling request (SR) transmission after a prior indication to skip PDCCH monitoring for a next one or more DRX ON duration(s) in accordance with various embodiments of this disclosure. Operations of flowchart 1400 can be implemented in a UE, such as UE 116 in FIG. 3.

Flowchart 1400 begins at operation 1402 by receiving an indication in a DCI format to skip PDCCH monitoring in a next one or more DRX ON duration(s). The UE can be configured with PUCCH resources for SR transmission. In operation 1404, PDCCH monitoring is skipped during associated DRX ON duration(s). For example, PDCCH monitoring can be skipped at least for DCI formats with CRC scrambled by C-RNTI in UE specific search space set(s), during the associated DRX ON durations when drx-onDurationTimer may not be running.

A positive SR is transmitted in operation 1406. The positive SR is transmitted when the UE has data to transmit. In one embodiment, the positive SR can be transmitted using a configured PUCCH resource for SR transmission. A determination is made in operation 1408 as to whether another field in the DCI format indicates that a positive SR transmission can override the indication to skip PDCCH monitoring. If another field in the DCI format indicates that the positive SR transmission can override the indication to skip PDCCH monitoring, then flowchart 1400 proceeds to operation 1410 and PDCCH is monitored at least for DCI formats scheduling PUSCH, e.g., DCI formats 0_0 or 0_1. In some embodiments, operation 1410 can also include restarting a timer associated with the DRX Active Time.

At operation 1408, if a determination is made that another field in the DCI does not indicate that a positive SR transmission can override the indication to skip PDCCH monitoring, then flowchart 1400 proceeds to operation 1412 and PDCCH monitoring is skipped during the associated DRX ON duration(s). In some embodiments, the UE can expect a serving gNB to indicate the UE to monitor PDCCH for DRX ON duration(s) in a next monitoring occasion of a PDCCH providing the indication.

Figure 15:
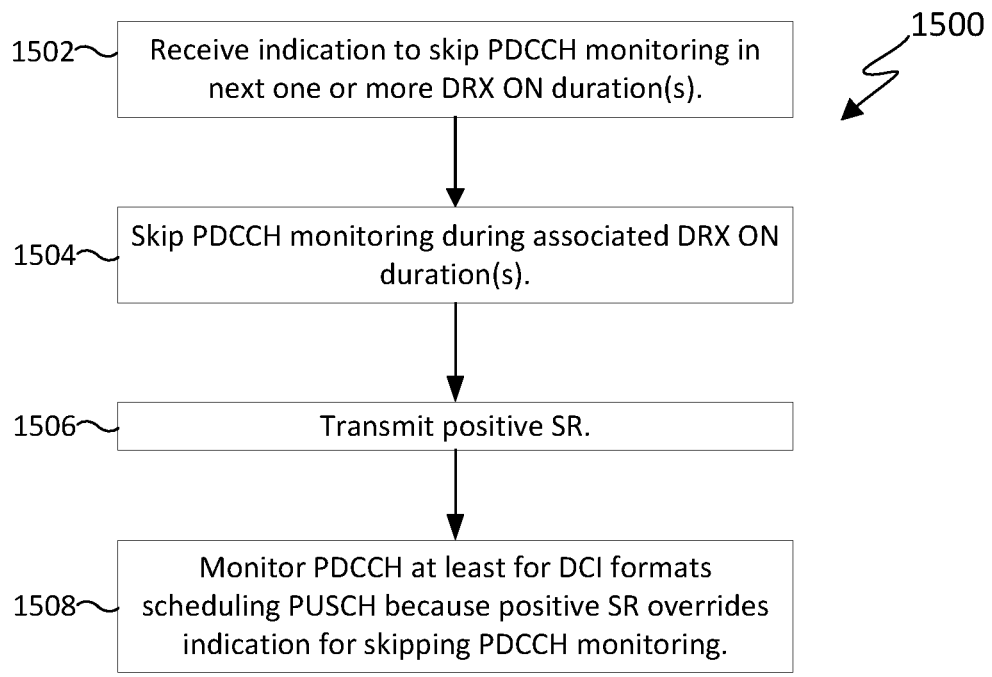
FIG. 15 illustrates another flowchart for PDCCH monitoring before and after a positive scheduling request (SR) transmission after a prior indication to skip PDCCH monitoring for a next one or more DRX ON duration(s) in accordance with various embodiments of this disclosure.

FIG. 15 illustrates another flowchart for PDCCH monitoring before and after a positive scheduling request (SR) transmission after a prior indication to skip PDCCH monitoring for a next one or more DRX ON duration(s) in accordance with various embodiments of this disclosure. Operations of flowchart 1500 can be implemented in a UE, such as UE 116 in FIG. 3.

Flowchart 1500 begins at operation 1502 by receiving an indication to skip PDCCH monitoring in a next one or more DRX ON duration(s), for example outside DRX Active Time in RRC_CONNECTED state. The UE can be configured with PUCCH resources for SR transmission. In operation 1504, PDCCH monitoring is skipped during the associated DRX ON duration(s). In some embodiments, PDCCH monitoring is skipped at least for DCI formats with CRC scrambled by C-RNTI in UE specific search space set(s), during the associated DRX ON durations when drx-onDurationTimer may not be running.

In operation 1506, a positive SR is transmitted. The positive SR, which is transmitted when the UE has data to transmit, can be transmitted using a configured PUCCH resource for SR transmission. In operation 1508, PDCCH for at least DCI formats scheduling PUSCH, e.g., DCI format 0_0 or 0_1, is monitored because positive SRs override indications for skipping PDCCH monitoring. In some embodiments, operation 1508 also includes restarting a timer associated with DRX Active Time. In one or more other embodiments, the UE may also be expected to monitor PDCCH for all DCI formats.

UE Behavior and Periodic/Semi-Persistent Data Transmission/Reception

Another embodiment of this disclosure considers a UE operation for periodic/semi-persistent data transmission/reception when the UE receives an indication to skip PDCCH monitoring for next one or more DRX ON duration(s) associated with RRC_CONNECTED state discontinuous reception (C-DRX) operation.

A UE can determine that an indication for skipping PDCCH monitoring in a next one or more DRX ON duration(s) does not apply to a configured-grant (CG) PUSCH transmission. Thus, the UE can transmit CG-PUSCH using the configured CG-PUSCH resources within configured DRX ON duration(s) even though the drx-onDurationTimer may not be running. Further, the UE can also monitor PDCCH for DCI formats scheduling a retransmission of a transport block in an initial CG-PUSCH transmission. Additionally, when the UE includes a buffer status report (BSR) in a CG-PUSCH transmission indicating additional data to transmit, the UE can cancel the indication to skip PDCCH monitoring, as it was previously described with respect to a positive SR transmission. The UE can be expected to monitor PDCCH at least in search space sets associated with DCI formats scheduling PUSCH transmissions. It is also possible that, after sending a BSR in a PUSCH transmission, the UE is expected to monitor PDCCH for all search space sets configured to the UE.

The UE can determine whether or not an indication for skipping PDCCH monitoring in next one or more DRX ON duration(s) applies to a configured-grant (CG) PUSCH transmission through any of the following approaches.

In one approach, the specification of system operation can define whether or not an indication for skipping PDCCH monitoring in next one or more DRX ON duration(s) applies to a configured-grant (CG) PUSCH transmission.

In another approach, high layer signaling provided to a UE can dictate whether or not an indication for skipping PDCCH monitoring in next one or more DRX ON duration(s) applies to a configured-grant (CG) PUSCH transmission.

In yet another approach, the physical layer signal/channel that provides the indication for skipping PDCCH monitoring in a next one or more DRX ON duration(s) can indicate whether or not an indication for skipping PDCCH monitoring in next one or more DRX ON duration(s) applies to a configured-grant (CG) PUSCH transmission. For example, when a UE receives a DCI format with an field to indicate the UE to skip PDCCH monitoring in next DRX ON duration, the UE can interpret another field of 1 bit to indicate whether or not the UE can ignore the indication for CG PUSCH and still transmit data through CG PUSCH, and monitor CS-RNTI for retransmission of CG PUSCH.

Figure 16:
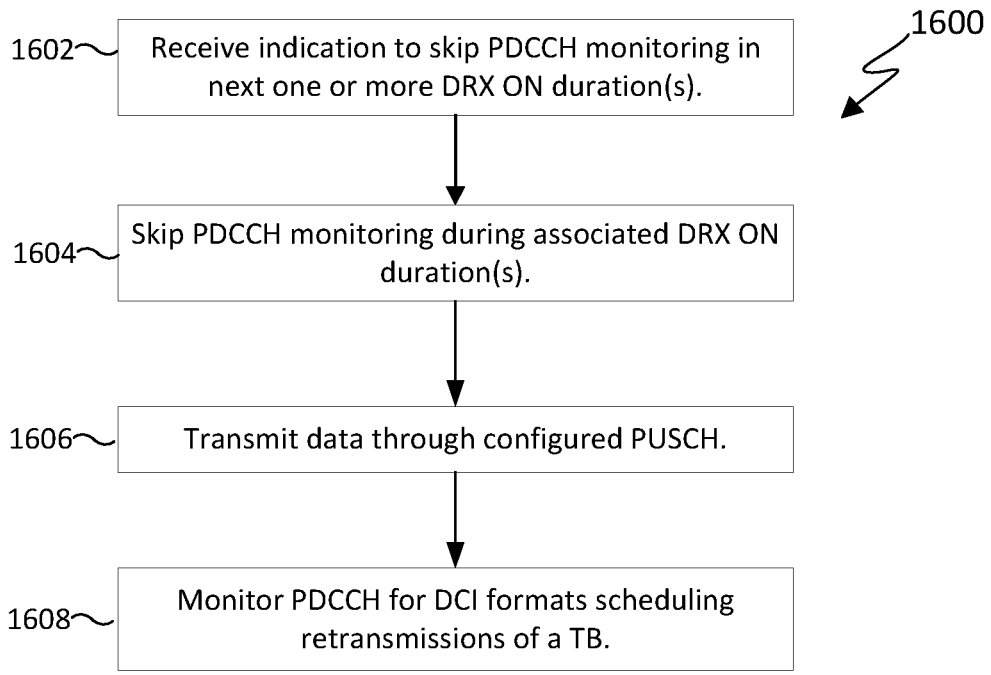
FIG. 16 illustrates a flowchart for PDCCH monitoring for DCI formats scheduling transmission of a CG-PUSCH after a prior indication to skip PDCCH monitoring in a next one or more DRX ON duration(s) in accordance with various embodiments of this disclosure.

FIG. 16 illustrates a flowchart for PDCCH monitoring for DCI formats scheduling transmission of a CG-PUSCH after a prior indication to skip PDCCH monitoring in a next one or more DRX ON duration(s) in accordance with various embodiments of this disclosure. Operations of flowchart 1600 can be implemented in a UE, such as UE 116 in FIG. 3.

Flowchart 1600 begins at operation 1602 by receiving an indication to skip PDCCH monitoring in a next one or more DRX ON duration(s). In operation 1604, PDCCH monitoring is skipped during associated DRX ON duration(s) when drx-onDurationTimer is not running. In operation 1606, data is transmitted through a next available/configured PUSCH and PDCCH is monitored for DCI formats scheduling retransmissions of a transport block in operation 1608.

When a UE receives (or does not receive) a power saving signal/channel, such as for example a PDCCH outside of DRX Active Time that provides a DCI format indicating to the UE to skip PDCCH monitoring for one or more DRX ON duration(s), a UE can determine that the indication by the power saving signal/channel for skipping PDCCH monitoring does not apply to semi-persistent (SPS) PDSCH reception. The UE is expected to receive SPS PDSCH although the drx-onDurationTimer may not be running. Further, the UE transmits HARQ-ACK information in response to the SPS PDSCH reception within configured DRX ON duration(s). At least when the UE transmits a negative acknowledgement (NACK), the UE is expected to monitor PDCCH for DCI formats scheduling a SPS PDSCH retransmission even though the UE was previously indicated to skip PDCCH monitoring within the DRX ON duration. It is also possible that the UE is expected to always monitor PDCCH for retransmissions of a TB in a SPS PDSCH transmission. Further, the PDCCH monitoring can be restricted to occur at specific occasions such as for example in slots of SPS PDSCH receptions.

A UE can determine whether or not the indication by the power saving signal/channel for skipping PDCCH monitoring applies to semi-persistent (SPS) PDSCH reception through any of the following approaches.

In one approach, the specification of the system operation can define whether or not an indication for skipping PDCCH monitoring in next one or more DRX ON duration(s) applies to a SPS PDSCH.

In another approach, high layer signaling provided to the UE can dictate whether or not an indication for skipping PDCCH monitoring in next one or more DRX ON duration(s) applies to a SPS PDSCH.

In yet another approach, the physical layer signal/channel that provides the indication for skipping PDCCH monitoring in a next one or more DRX ON duration(s) can indicate whether or not an indication for skipping PDCCH monitoring in next one or more DRX ON duration(s) applies to a SPS PDSCH. For example, when a UE receives a DCI format with an field to indicate the UE to skip PDCCH monitoring in next DRX ON duration, the UE can interpret another field of 1 bit to indicate whether or not the UE can ignore the indication for SPS PDSCH and still receives data through SPS PDSCH, and monitor CS-RNTI for retransmission of SPS PUSCH.

Figure 17:
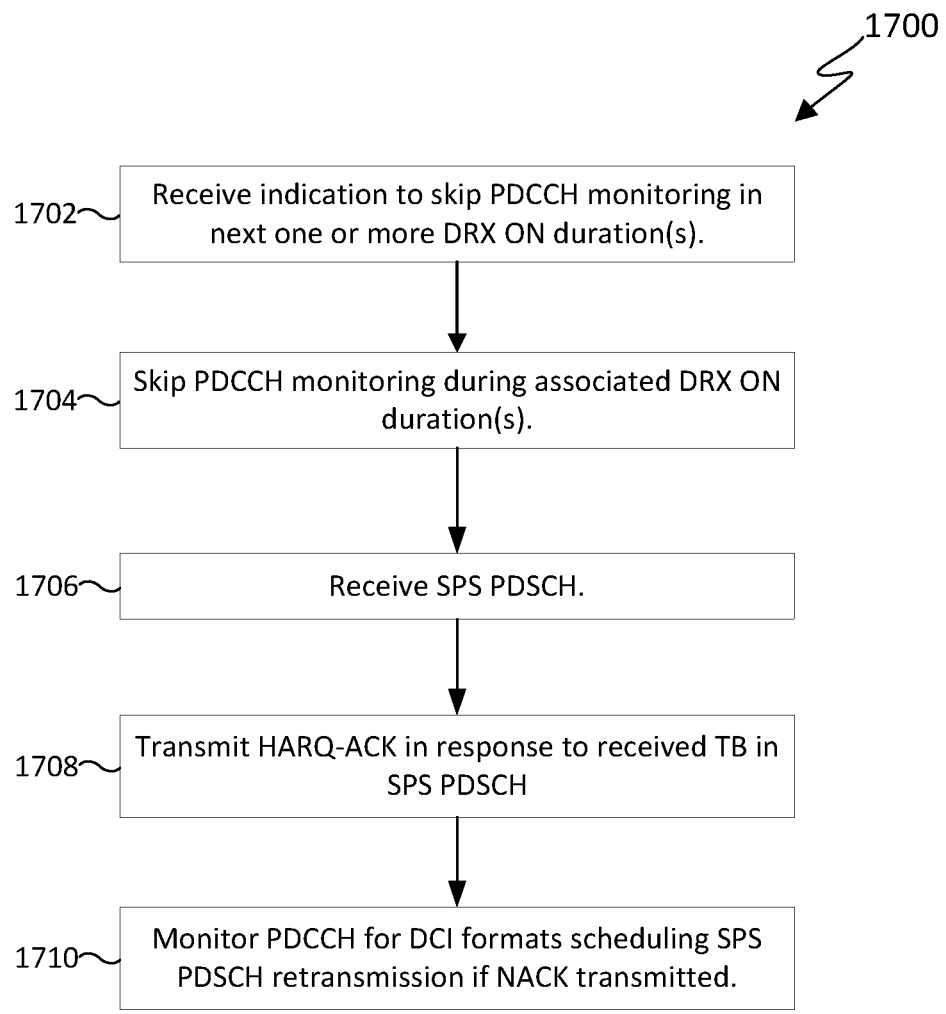
FIG. 17 illustrates a flowchart for PDCCH monitoring with SPS PDCSH reception in response to HARQ-ACK transmission with NACK value after a prior indication to skip PDCH monitoring for a next one or more DRX ON duration(s) in accordance with various embodiments of this disclosure.

FIG. 17 illustrates a flowchart for PDCCH monitoring with SPS PDCSH reception in response to HARQ-ACK transmission with NACK value after a prior indication to skip PDCH monitoring for a next one or more DRX ON duration(s) in accordance with various embodiments of this disclosure. Operations of flowchart 1700 can be implemented in a UE, such as UE 116 in FIG. 3.

Flowchart 1700 begins at operation 1702 by receiving an indication to skip PDCCH monitoring in a next one or more DRX ON duration(s). In operation 1704, PDCCH monitoring is skipped during the associated DRX ON duration(s). In some embodiments, PDCCH may still be monitored for DCI formats with CRC scrambled by a CS-RNTI. In operation 1706, a SPS PDSCH is received. Thereafter, HARQ-ACK information is transmitted in response to the received transport block in the SPS PDSCH in operation 1708. In operation 1710, PDCCH is monitored for DCI formats scheduling SPS PDSCH retransmissions for the TB if the UE transmits a NACK 905. In some embodiments, PDCCH can be monitored for a DCI format scheduling retransmission of a TB in an initial SPS PDSCH transmission regardless of the value of the HARQ-ACK information provided.

UE Behavior and CSI Measurements, CSI Reports, and SRS Transmissions

Another embodiment of this disclosure concerns UE operation for periodic/semi-persistent CSI measurements, periodic/semi-persistent CSI reports, and SRS transmission when the UE is indicated to skip PDCCH monitoring for next one or more DRX ON duration(s) associated with RRC_CONNECTED state discontinuous reception (C-DRX) operation.

Periodic/semi-persistent CSI-RS measurements or periodic/semi-persistent CSI reports are primarily used for enabling link adaptation of scheduled unicast receptions by a UE, such as PDCCH or PDSCH receptions, for mobility support, and for beam management. When a UE receives an indication to skip PDCCH monitoring for next one or more DRX ON duration(s), such as for example when the UE receives (or does not receive) a power saving signal/channel outside of DRX Active Time, the UE cannot be scheduled to receive PDSCH. Therefore, the UE can skip periodic/semi-persistent CSI-RS measurements or periodic/semi-persistent CSI reports associated with link adaptation of PDCCH or PDSCH receptions. However, it is beneficial for the UE to not skip periodic/semi-persistent CSI-RS measurements or periodic/semi-persistent CSI reports associated with beam management as such skipping can result to a link failure. For example, the UE can be expected to report a reference signal received power (RSRP) for a CSI-RS configuration.

In one approach of determining periodic/semi-persistent CSI-RS measurements or periodic/semi-persistent CSI reports, the UE expects to perform periodic/semi-persistent CSI-RS measurements or periodic/semi-persistent CSI reports according to the specification of the system operation in DRX ON duration(s), when the UE receives an indication for skipping PDCCH monitoring in the DRX ON duration(s). For example, the UE expects to perform periodic/semi-persistent CSI-RS measurements or periodic/semi-persistent CSI reports associated with beam management even when the drx-onDurationTimer may not be running due to an indication for skipping PDCCH monitoring in next DRX ON duration. The UE can determine whether or not the periodic/semi-persistent CSI-RS measurements or reporting is associated with beam management through any of the following examples.

Example 1: The report quantity provided in the configuration includes only L1 RSRP, for example, CSI-RS resource indicator RSRP (CRI-RSRP) or ssb-Index-RSRP as defined in REF 7.

Example 2: The report quantity provided in the configuration includes L1 RSRP and/or other quantities. When the UE is indicated to skip PDCCH monitoring, the UE is expected to ignore other quantities and only report L1 RSRP.

When an activation of PDCCH monitoring, at least for PDSCH receptions, is initiated by the UE, for example after a positive SR transmission as previously described, the UE can be expected to start performing periodic/semi-persistent CSI-RS measurements and providing periodic/semi-persistent CSI reports associated with link adaptation according to previously provided configurations during the DRX ON duration(s).

Figure 18:
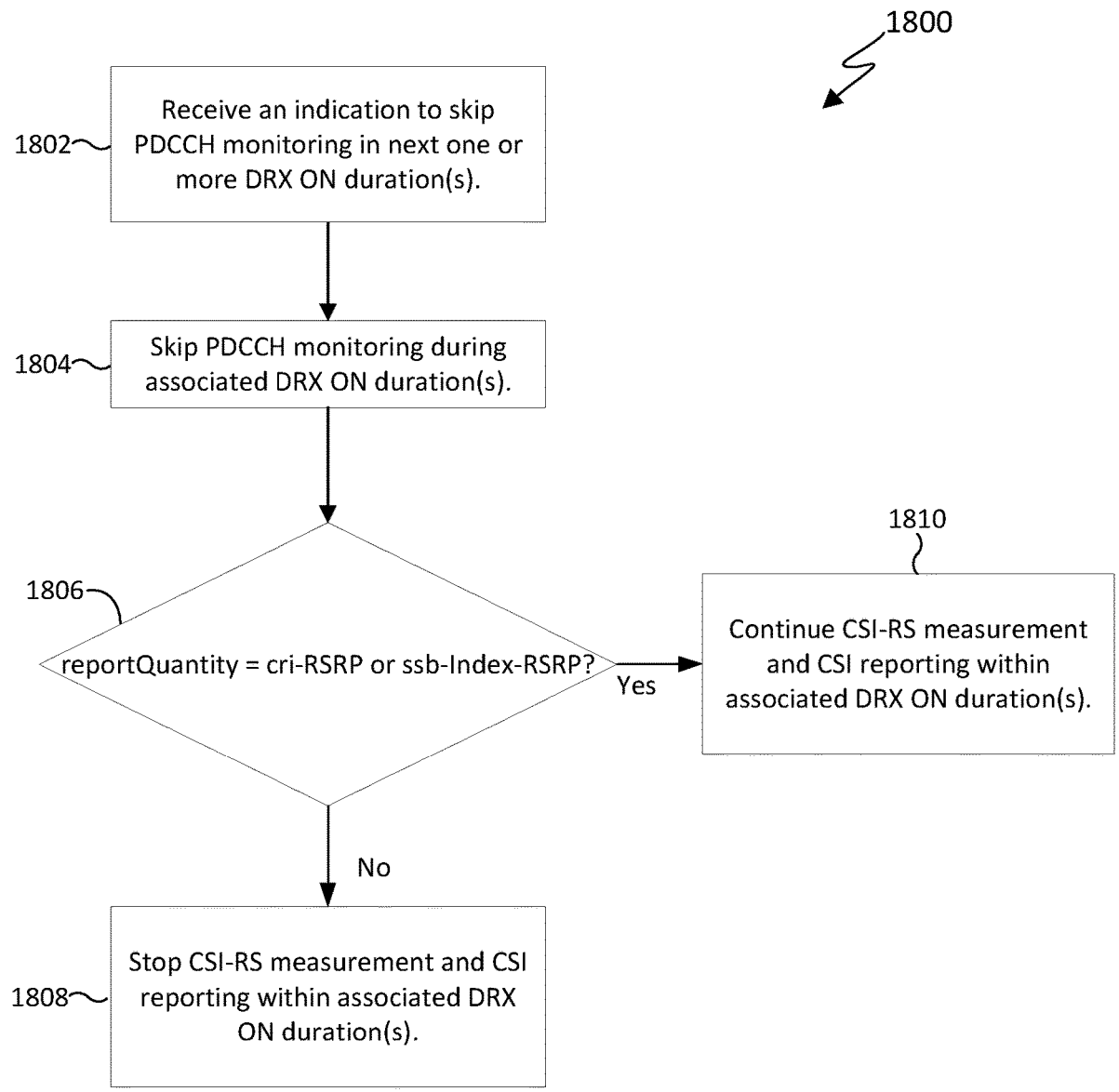
FIG. 18 illustrates a flowchart for periodic/semi-persistent CSI-reception/reporting when a DCI format provides an indication to skip PDCCH monitoring for a next one or more DRX ON duration(s) in accordance with various embodiments of this disclosure.

FIG. 18 illustrates a flowchart for periodic/semi-persistent CSI-reception/reporting when a DCI format provides an indication to skip PDCCH monitoring for a next one or more DRX ON duration(s) in accordance with various embodiments of this disclosure. Operations of flowchart 1800 can be implemented in a UE, such as UE 116 in FIG. 3, with a configuration for periodic/semi-persistent CSI-RS measurements or periodic/semi-persistent CSI reporting.

Flowchart 1800 begins at operation 1802 by receiving an indication to skip PDCCH monitoring in a next one or more DRX ON duration(s). In operation 1804, PDCCH monitoring is skipped during the associated DRX ON duration(s). In operation 1806, a determination is made as to whether the periodic/semi-persistent CSI measurement or reporting is associated with beam management/reporting based on configured report quantity, i.e. reportQuantity, as described in REF 7.

For a periodic/semi-persistent CSI-RS report, if reportQuantity is CRI-RSRP or ssb-Index-RSRP as defined in REF 7, the associated CSI report is used for beam reporting and flowchart 1800 proceeds from operation 1806 to operation 1810 to allow CSI-RS measurement and reporting to the serving gNB within the associated DRX ON duration(s). Otherwise, if reportQuantity is none or is cri-RI-PMI-CQI or cri-RI-i1 or cri-RI-i1-CQI or cri-RI-CQI or cri-RI-LI-PMI-CQI as defined in REF7, then flowchart 1800 proceeds from operation 1806 to operation 1808 so that CSI-RS measurement and reporting of corresponding CSI within the associated DRX ON duration(s) can be stopped or skipped.

In another approach of determining periodic/semi-persistent CSI-RS measurements or periodic/semi-persistent CSI reports, the UE can receive an indication by higher layer signaling which dictates whether or not the UE is expected to perform periodic/semi-persistent CSI-RS measurements or periodic/semi-persistent CSI reports in DRX ON duration(s) when the UE receives an indication for skip PDCCH monitoring in the DRX ON duration(s). For example, the configuration of periodic/semi-persistent CSI-RS resources for measurement or periodic/semi-persistent CSI report can include an RRC parameter to indicate whether or not UE can continue perform periodic/semi-persistent CSI-RS measurements or periodic/semi-persistent CSI reports in DRX ON duration(s) when the UE receives an indication to skip PDCCH monitoring in the DRX ON duration(s), and the drx-onDurationTimer may not be running.

In yet another approach of determining periodic/semi-persistent CSI-RS measurements or periodic/semi-persistent CSI reports, when the UE receives an indication in a physical layer signal/channel for skipping PDCCH monitoring in one or more DRX ON duration(s), the physical layer signal/channel can include another indication for whether or not the UE is expected to perform periodic/semi-persistent CSI-RS measurements or periodic/semi-persistent CSI reports in the associated DRX ON duration(s), even though drx-onDurationTimer may not be running. For example, a UE receives a DCI format with a field indicating to the UE to skip PDCCH monitoring for next DRX ON duration, and another field in the DCI format, e.g. 1 bit, can be used to determine whether or not the UE can perform periodic/semi-persistent CSI-RS measurements or periodic/semi-persistent CSI reports in the DRX ON duration.

Figure 19:
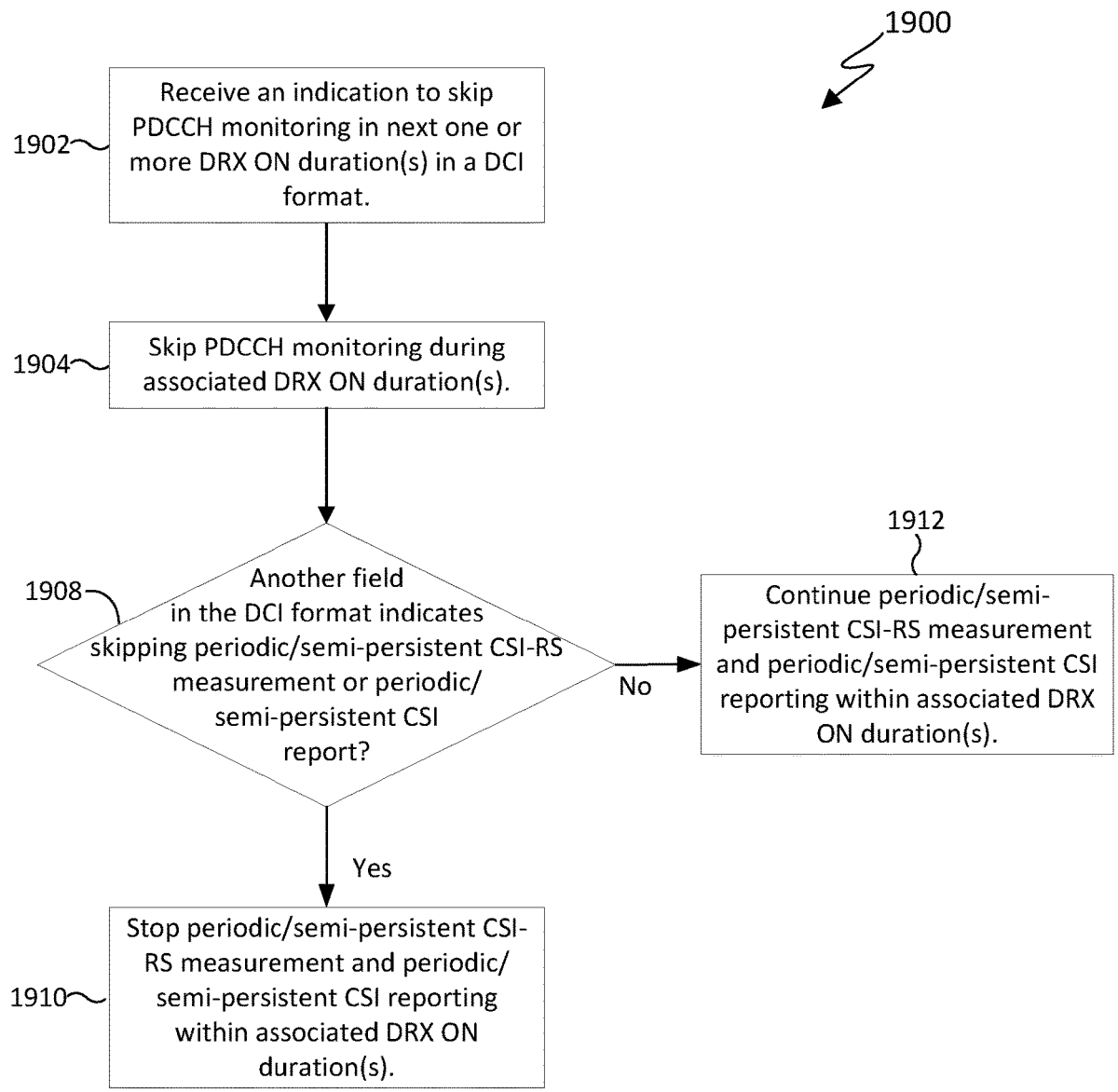
FIG. 19 illustrates another flowchart for periodic/semi-persistent CSI-reception/reporting when a DCI format provides an indication to skip PDCCH monitoring for a next one or more DRX ON duration(s) in accordance with various embodiments of this disclosure.

FIG. 19 illustrates another flowchart for periodic/semi-persistent CSI-reception/reporting when a DCI format provides an indication to skip PDCCH monitoring for a next one or more DRX ON duration(s) in accordance with various embodiments of this disclosure. Operations of flowchart 1900 can be implemented in a UE, such as UE 116 in FIG. 3, which is configure for periodic/semi-persistent CSI-RS measurement or reporting.

Flowchart 1900 begins at operation 1902 by receiving an indication in a DCI format to skip PDCCH monitoring in a next one or more DRX ON duration(s). In operation 1904, PDCCH monitoring is skipped during the associated DRX ON duration(s). In operation 1906 a determination is made as to whether another field in the DCI format indicates skipping periodic/semi-persistent CSI-RS measurements or reporting in the associated DRX ON duration(s). If another field in the DCI format indicates skipping periodic/semi-persistent CSI-RS measurement or reporting, then flowchart 1900 proceeds from operation 1908 to operation 1910 and periodic/semi-persistent CSI-RS measurement and/or reporting is stopped within the associated DRX ON duration(s). However, if another field in the DCI format does not indicate skipping periodic/semi-persistent CSI-RS measurement and/or reporting, then flowchart 1900 proceeds from operation 1908 to operation 1912 and periodic/semi-persistent CSI-RS measurement and/or reporting is continued within the associated DRX ON duration(s).

Periodic/semi-persistent SRS transmissions are primarily used for enabling link adaptation of scheduled unicast transmissions by a UE, such as PUCCH or PUSCH transmissions. Periodic/semi-persistent SRS transmissions are also used for unpaired spectrum operation such as in TDD bands, for link adaptation of scheduled unicast receptions from the UE, such as PDCCH or PDSCH receptions. However SRS transmission may be used for other purposes, such as link failure recovery or beam management.

In one approach for determining periodic/semi-persistent SRS transmission, when a UE is indicated to skip PDCCH monitoring in next one or more DRX ON duration(s), a UE can skip periodic/semi-persistent SRS transmissions when the UE does not monitor PDCCH for DCI formats scheduling PDSCH or PUSCH. When an activation of such PDCCH monitoring is initiated by the UE, for example after a positive SR transmission as previously described, the UE can start periodic/semi-persistent SRS transmissions according to a previously provided configuration during the DRX ON duration(s).

Figure 20:
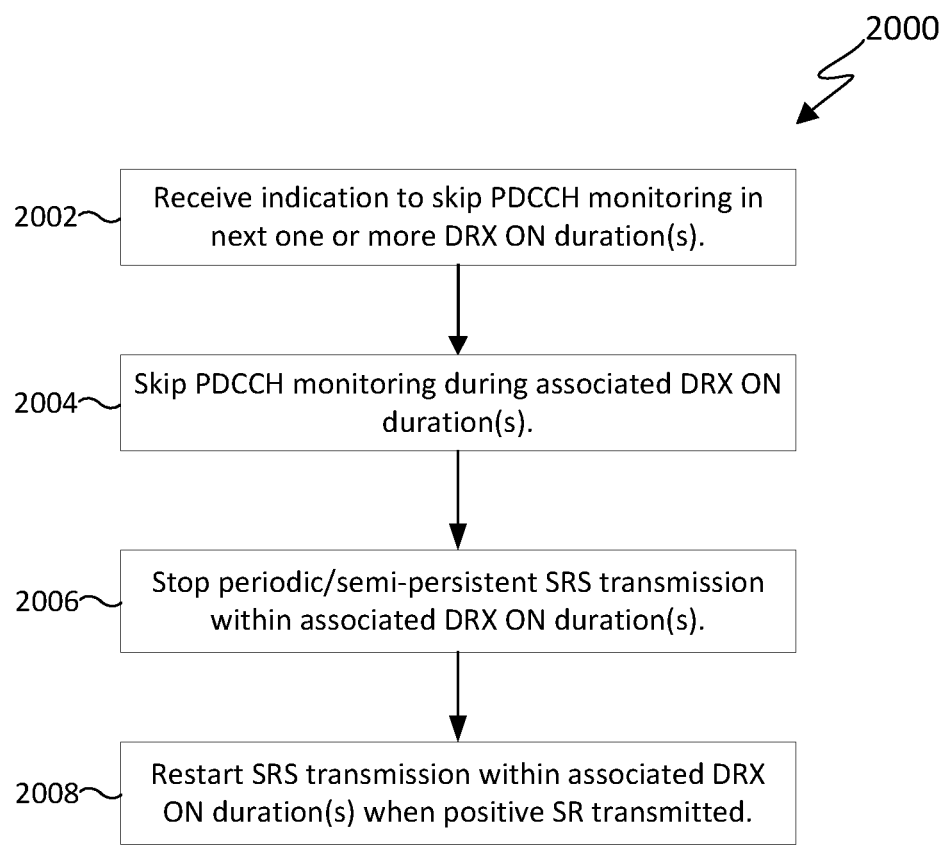
FIG. 20 illustrates a flowchart for periodic/semi-persistent sounding reference signal (SRS) transmission after a previous indication to skip PDCCH monitoring for a next one or more DRX ON duration(s) in accordance with various embodiments of this disclosure.

FIG. 20 illustrates a flowchart for periodic/semi-persistent SRS transmission after a previous indication to skip PDCCH monitoring for a next one or more DRX ON duration(s) in accordance with various embodiments of this disclosure. Operations of flowchart 2000 can be implemented in a UE, such as UE 116 in FIG. 3, which is configured for periodic or semi-persistent SRS transmission.

Flowchart 2000 begins at operation 2002 by receiving an indication to skip PDCCH monitoring in a next one or more DRX ON duration(s). In operation 2004, PDCCH monitoring is skipped during the associated DRX ON duration(s). In operation 2006, periodic/semi-persistent SRS transmission is stopped within the associated DRX ON duration(s). In operation 2008, SRS transmission within the associated DRX ON duration(s) is restarted when the UE starts PDCCH monitoring for DCI formats scheduling PDSCH receptions or PUSCH transmissions. PDCCH monitoring can be started autonomously, e.g., after transmission of a positive SR, or based on an indication received from a serving gNB.

In another approach for determining periodic/semi-persistent SRS transmission when the UE is indicated to skip PDCCH monitoring in next one or more DRX ON duration(s), the UE can be provided by higher layer signaling for whether or not the UE expects to perform periodic/semi-persistent SRS transmission in DRX ON duration(s) regardless of the indication of skipping PDCCH monitoring in the DRX ON duration.

In yet another approach for determining periodic/semi-persistent SRS transmission when the UE is indicated to skip PDCCH monitoring for next one or more DRX ON duration(s), an indication for whether or not the UE performs periodic/semi-persistent SRS transmission in next DRX ON duration(s) can be included in the physical layer signal/channel that includes the indication for skipping PDCCH monitoring in next DRX ON duration(s).

Figure 21:
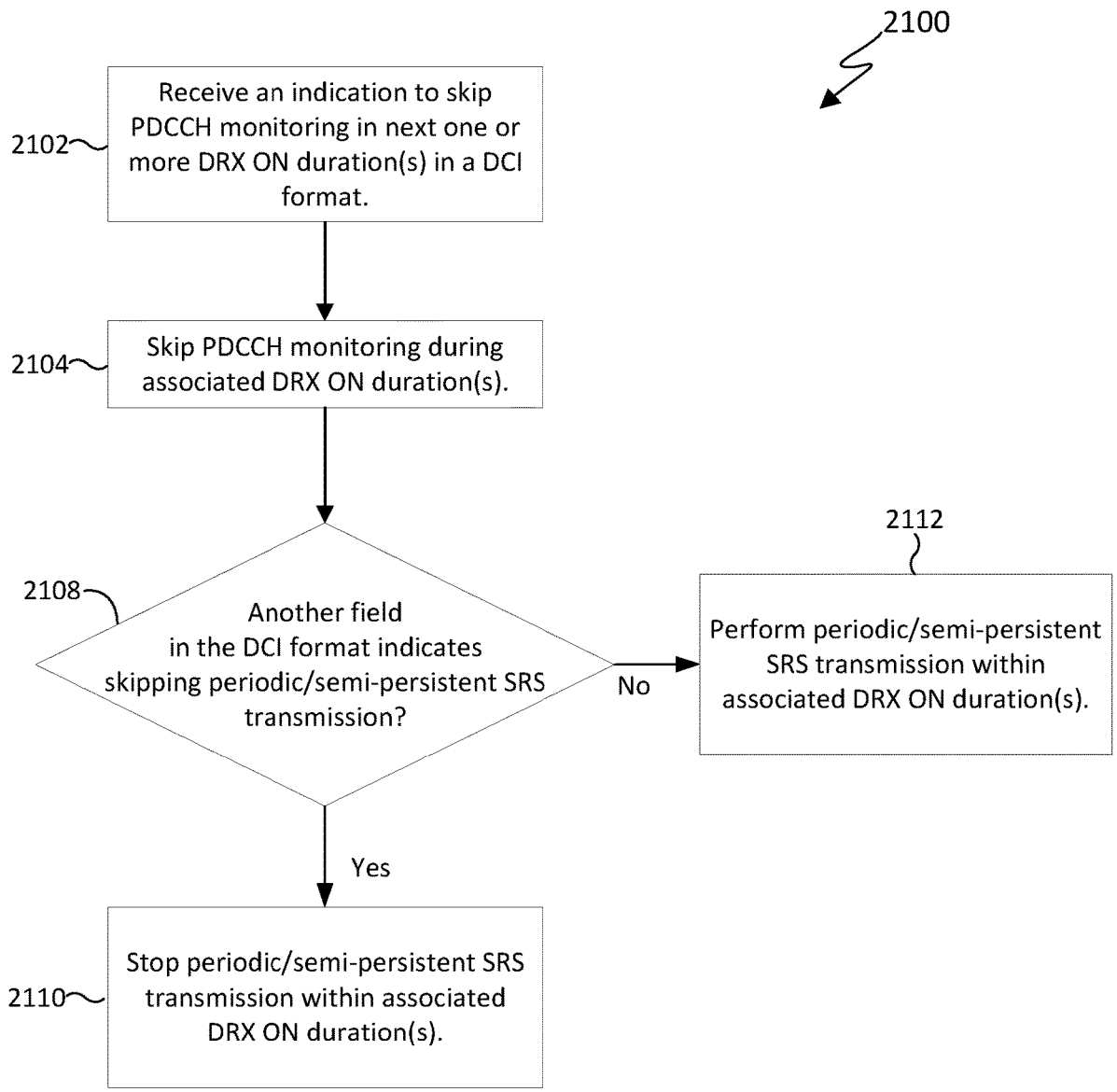
FIG. 21 illustrates another flowchart for periodic/semi-persistent SRS transmission after a previous indication to skip PDCCH monitoring for a next one or more DRX ON duration(s) in accordance with various embodiments of this disclosure.

FIG. 21 illustrates another flowchart for periodic/semi-persistent SRS transmission after a previous indication to skip PDCCH monitoring for a next one or more DRX ON duration(s) in accordance with various embodiments of this disclosure. Operations of flowchart 2100 can be implemented in a UE, such as UE 116 in FIG. 3, which is configured for periodic or semi-persistent SRS transmission.

Flowchart 2100 begins at operation 2102 by receiving an indication in a DCI format to skip PDCCH monitoring in a next one or more DRX ON duration(s). In operation 2104, PDCCH monitoring is skipped during the associated DRX ON duration(s). A determination is made in operation 2108 as to whether another field in the DCI format indicates that periodic/semi-persistent SRS transmissions can be skipped in the associated DRX ON duration(s). If another field in the DCI format indicates that periodic/semi-persistent SRS transmission can be skipped in the associated DRX ON duration(s), then flowchart 2100 proceeds from operation 2108 to operation 2110 where periodic/semi-persistent SRS transmission can be stopped or skipped within the associated DRX ON duration(s). However, if the DCI format does not have another field indicating to skip periodic/semi-persistent SRS transmission, then flowchart 2100 proceeds from operation 2108 to operation 2112 where periodic/semi-persistent SRS transmission is performed within the associated DRX ON duration(s) even though the drx-onDurationTimer may not be running.

UE Behavior and PRACH Transmissions

Another embodiment of this disclosure considers a UE operation for transmissions of a physical random access channel (PRACH) when the UE receives an indication to skip PDCCH monitoring for next one or more DRX ON duration(s) associated with RRC_CONNECTED state discontinuous reception (C-DRX) operation.

For PRACH transmission, a UE can ignore the indication for operation in a power saving mode such as for skipping PDCCH monitoring during DRX ON duration(s). A UE in the RRC_CONNECTED state can transmit a PRACH for various purposes including re-establishing synchronization with a serving gNB, obtaining a timing advance command from the gNB, indicating link recovery, or indicating new data arrival and then the PRACH transmission also provides the functionality of a positive SR transmission. After a PRACH transmission, the UE can start monitoring PDCCH in order to detect a DCI format scheduling a reception of a PDSCH that provides a random access response (RAR) from a serving gNB in response to the PRACH transmission from the UE. After receiving the PDSCH providing the RAR, the UE can switch back to skipping PDCCH monitoring or can be expected to continue to monitor PDCCH and then the PRACH transmission overrides the previous indication for skipping PDCCH monitoring during the one or more DRX ON duration period(s) as it was previously described with respect to a positive SR transmission.

For link recovery, after a UE transmits a PRACH, the PRACH transmission overrides a previous indication to the UE to skip PDCCH monitoring and the UE is expected to monitor PDCCH for a DCI format with CRC scrambled by C-RNTI or MCS-C-RNTI at least for a search space set provided by recoverySearchSpaceId as described in REF 3.

Figure 22:
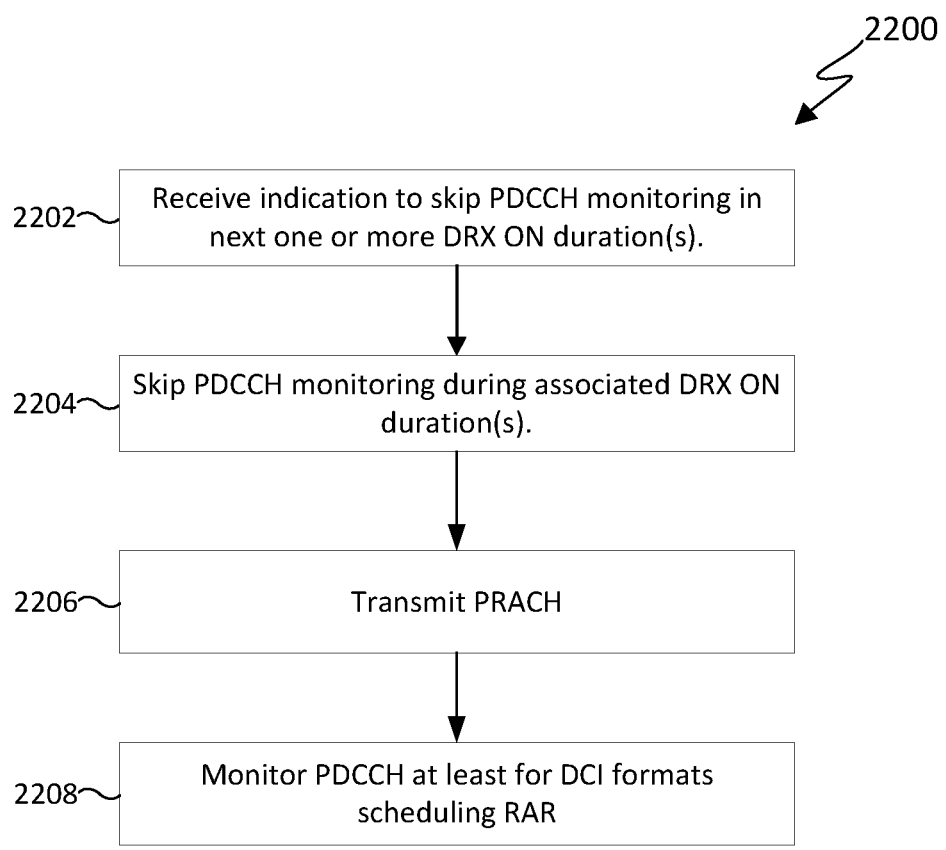
FIG. 22 illustrates a flowchart for a RACH procedure after a previous indication to skip PDCCH monitoring for a next one or more DRX ON duration(s)

FIG. 22 illustrates a flowchart for a RACH procedure after a previous indication to skip PDCCH monitoring for a next one or more DRX ON duration(s). Operations of flowchart 2200 can be implemented in a UE, such as UE 116 in FIG. 3.

Flowchart 2200 begins at operation 2202 by receiving an indication to skip PDCCH monitoring in a next one or more DRX ON duration(s) outside DRX Active Time in RRC_CONNECTED state. In operation 2204, PDCCH monitoring is skipped during the associated DRX ON duration(s). In one embodiment, PDCCH monitoring is skipped for DCI format with CRC scrambled by C-RNTI in UE specific search space set(s) during the associated DRX ON durations. In operation 2206, a PRACH is transmitted to a serving gNB even though the drx-onDurationTimer may not be running. In operation 2208, monitoring of PDCCH resumes to detect a DCI format scheduling a reception of a PDSCH that provides a random access response (RAR) from a serving gNB in response to the PRACH transmission from the UE.

Figure 23:
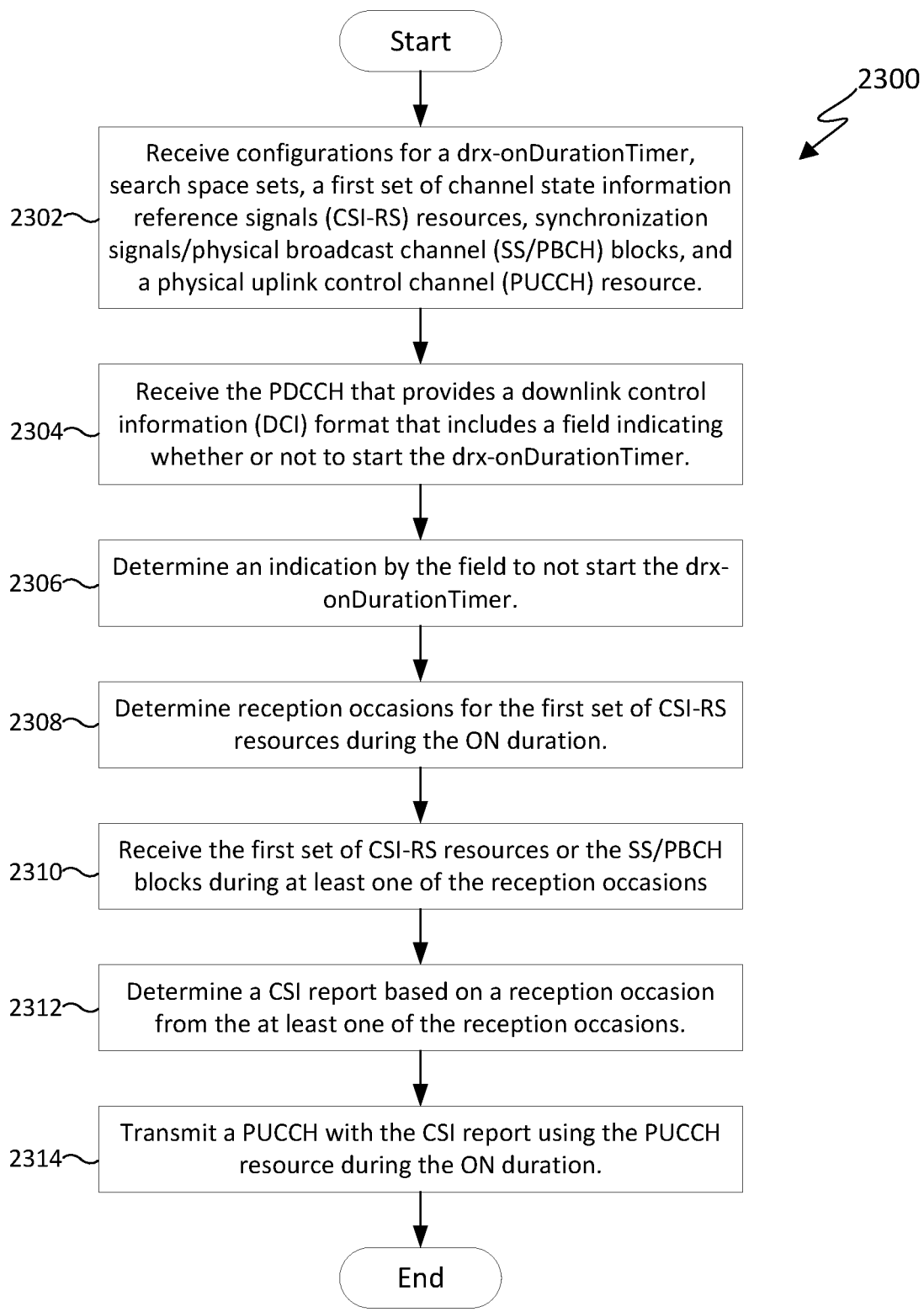
FIG. 23 illustrates a flowchart of a process for managing UE operation during C-DRX in accordance with various embodiments of this disclosure.

FIG. 23 illustrates a flowchart of a process for managing UE operation during C-DRX in accordance with various embodiments of this disclosure. Operations of flowchart 2300 can be implemented in a UE, such as UE 116 in FIG. 3.

Flowchart 2300 begins at operation 2302 by receiving configurations for (i) a drx-onDurationTimer corresponding to an ON duration of a discontinuous reception (DRX) cycle, (ii) search space sets for reception of a physical downlink control channel (PDCCH) prior to the ON duration of the DRX cycle, (iii) a first set of channel state information reference signal (CSI-RS) resources, (iv) synchronization signals/physical broadcast channel (SS/PBCH) blocks, and (v) a physical uplink control channel (PUCCH) resource.

In operation 2304, the PDCCH is received that provides a DCI format that includes a field indicating whether or not to start the drx-onDurationTimer.

In operation 2306, an indication by the field in the DCI format is determined to not start the drx-onDurationTimer.

In operation 2308 reception occasions are determined for the first set of CSI-RS resources during the ON duration. In some embodiments, operation 2308 can also include the additional operation determining second reception occasions for a second set of CSI-RS resources during the ON duration when the DRX cycle is larger than 80 milliseconds. In addition, operation 2308 can, in some embodiments, include determining the reception occasion to be one of a last reception occasion from the at least one of the reception occasions during DRX active time, and the reception occasion from the at least one of the reception occasions during the ON duration outside the DRX active time.

In operation 2310 the first set of CSI-RS resources or the SS/PBCH blocks are received during at least one of the reception occasions. In embodiments, where second reception occasions are determined for the second set of CSI-RS resources, operation 2310 can include the additional operation of receiving the second set of CSI-RS resources during at least one of the second reception occasions. Radio resource management (RRM) measurement can be performed based on the reception occasion from the at least one of the second reception occasions.

In operation 2312 a CSI-RS report based on a reception occasion from the at least one of the reception occasions is determined. In some embodiments, the CSI report includes a layer 1 reference signal received power (L1-RSRP) report. Additionally, a report quantity associated with the L1-RSRP report can a CSI-RS resource indicator (cri-RSRP) or a synchronization signal/primary broadcast channel (SS/PBCH) block index (ssb-Index-RSRP).

In operation 2314 a PUCCH is transmitted with the CSI report using the PUCCH resource during the ON duration. In some embodiments, operation 2314 can include additional operations of determining a slot for the transmission of the PUCCH and transmitting the PUCCH in the slot only when the reception occasion is before the slot.

In some embodiments, the process described in flowchart 2300 can also include an operation of receiving a configuration for a parameter enabling or disabling transmission of the PUCCH. The parameter further enables or disables the L1-RSRP report to be included in the CSI report.

Although this disclosure has been described with an exemplary embodiment, various changes and modifications may be suggested to one skilled in the art. For example, this disclosure includes several embodiments that can be used in conjunction or in combination with one another, or individually. It is intended that this disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method of a terminal in a wireless communication system supporting a discontinuous reception (DRX) operation, the method comprising:
   receiving, from a base station via user equipment (UE) specific radio resource control (RRC) signaling, configuration information related to at least one of periodic measurement or periodic CSI reporting;
   receiving, from the base station, a downlink control information (DCI) format indicating whether the terminal is to monitor a physical downlink control channel (PDCCH), wherein the DCI format is for power saving and the DCI format is configured based on an identifier of the terminal;
   determining:
      that the DCI format indicates the terminal to skip monitoring the PDCCH, and
      whether the configuration information includes first information indicating that the terminal is to transmit periodic channel state information (CSI) reporting when the terminal is indicated by the DCI format to skip monitoring the PDCCH;
   performing the periodic CSI reporting when the configuration information includes the first information; and
   canceling the periodic CSI reporting when the configuration information does not include the first information.

2. The method of claim 1, further comprising performing periodic measurement includes periodic measurement or L1 reference signal received power (RSRP) measurement based on a channel state information-reference signal (CSI-RS).

3. The method of claim 1, wherein the DCI format with a cyclical redundancy check (CRC) scrambled by the identifier of the terminal is detected outside of a DRX active time.

4. The method of claim 1, wherein periodic measurement or the periodic CSI reporting is performed during a time duration indicated by a DRX on-duration timer based on the configuration information.

5. The method of claim 1, wherein the periodic measurement is performed during a time duration indicated by a DRX on-duration.

6. The method of claim 1, further comprising:
   determining whether the configuration information includes a second information indicating that the terminal is to transmit a periodic L1 reference signal received power (RSRP) report when the terminal is indicated by the DCI format to skip monitoring PDCCH;
   performing the periodic CSI reporting when the configuration information includes the second information, wherein a report quality for the periodic CSI report is L1 RSRP, and
   canceling the periodic CSI reporting when the configuration information does not include the second information.

7. The method of claim 1, further comprising:
   performing the periodic CSI reporting during DRX on-duration in case that the DCI format indicates that the terminal is to monitor the PDCCH.

8. A terminal in a wireless communication system supporting a discontinuous reception (DRX) operation, the terminal comprising:
   a transceiver configured to
      receive, from a base station via user equipment (UE) specific radio resource control (RRC) signaling, configuration information related to at least one of periodic measurement or periodic CSI reporting, and
      receive, from the base station, a downlink control information (DCI) format indicating whether the terminal is to monitor a physical downlink control channel (PDCCH), wherein the DCI format is for power saving and the DCI format is configured based on an identifier of the terminal; and
   a processor configured to
      determine:
         that the DCI format indicates the terminal to skip monitoring the PDCCH, and
         whether the configuration information includes first information indicating that the terminal is to transmit periodic channel state information (CSI) reporting when the terminal is indicated by the DCI format to skip monitoring the PDCCH,
      perform the at least one of the periodic measurement or the periodic reporting based on the configuration information in case that the DCI format indicates that the terminal is to skip monitoring the PDCCH, and
      cancel the periodic CSI reporting when the configuration information does not include the first information.

9. The terminal of claim 8, wherein the processor is configured to perform periodic measurement includes periodic measurement or L1 reference signal received power (RSRP) measurement based on a channel state information-reference signal (CSI-RS).

10. The terminal of claim 8, wherein the DCI format with a cyclical redundancy check (CRC) scrambled by the identifier of the terminal is detected outside of a DRX active time.

11. The terminal of claim 8, wherein the at least one of the the periodic CSI reporting is performed during a time duration indicated by a DRX on-duration timer based on the configuration information.

12. The terminal of claim 8, wherein the periodic measurement is performed during a time duration indicated by a DRX on-duration.

13. The terminal of claim 8, wherein the processor is configured to
   determine whether the configuration information includes a second information indicating whether the terminal is to transmit a periodic L1 RSRP report,
   perform the periodic CSI reporting when the configuration information includes the second information, wherein a report quality for the periodic CSI report is L1 RSRP, and
   cancel the periodic CSI reporting when the configuration information does not include the second information.

14. The terminal of claim 8, wherein the processor is further configured to perform the periodic CSI reporting during DRX on-duration in case that the DCI format indicates that the terminal is to monitor the PDCCH.

15. A base station in a wireless communication system supporting a discontinuous reception (DRX) operation, the base station comprising:
   a transceiver configured to
      transmit, to a terminal via user equipment (UE) specific radio resource control (RRC) signaling, configuration information related to at least one of periodic measurement or periodic CSI reporting,
      transmit, to the terminal, a downlink control information (DCI) format indicating whether the terminal is to monitor a physical downlink control channel (PDCCH), wherein the DCI format is for power saving and the DCI format is configured based on an identifier of the terminal, wherein the DCI format indicates the terminal to skip monitoring the PDCCH, receive the periodic CSI reporting when the configuration information includes first information, and not receive the periodic CSI reporting when the configuration information does not include the first information.

16. The base station of claim 15, wherein the periodic measurement includes periodic measurement or L1 reference signal received power (RSRP) measurement based on a channel state information-reference signal (CSI-RS).

17. The base station of claim 15, wherein the DCI format with a cyclical redundancy check (CRC) scrambled by the identifier of the terminal is detected outside of a DRX active time.

18. The base station of claim 15, wherein periodic measurement or the periodic CSI reporting is performed during a time duration indicated by a DRX on-duration timer based on the configuration information.

19. The base station of claim 15, wherein the periodic measurement is performed during a time duration indicated by a DRX on-duration.

20. The base station of claim 15, wherein based on a determination of whether the configuration information includes a second information indicating that the terminal is to transmit a periodic L1 reference signal received power (RSRP) report when the terminal is indicated by the DCI format to skip monitoring PDCCH, the transceiver is configured to receive the periodic CSI reporting when the configuration information includes the second information, wherein a report quality for the periodic CSI report is L1 RSRP, and not receive the periodic CSI reporting when the configuration information does not include the second information.

* * * * *